(12) United States Patent
Zhou et al.

(10) Patent No.: US 11,825,373 B2
(45) Date of Patent: Nov. 21, 2023

(54) REFERENCE MEASUREMENT TIMING SELECTION FOR WIRELESS COMMUNICATION MOBILITY

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 17/202,944

(22) Filed: Mar. 16, 2021

(65) Prior Publication Data

US 2021/0337455 A1 Oct. 28, 2021

Related U.S. Application Data

(60) Provisional application No. 63/015,365, filed on Apr. 24, 2020.

(51) Int. Cl.
*H04W 36/00* (2009.01)
*H04W 36/32* (2009.01)
(Continued)

(52) U.S. Cl.
CPC ....... *H04W 36/32* (2013.01); *H04W 36/0058* (2018.08); *H04W 36/0061* (2013.01);
(Continued)

(58) Field of Classification Search
CPC ......... H04W 36/0058; H04W 36/0061; H04W 36/0085; H04W 36/08; H04W 36/32;
(Continued)

(56) References Cited

U.S. PATENT DOCUMENTS

2019/0379506 A1* 12/2019 Cheng .................. H04L 1/0026
2020/0045655 A1  2/2020 Joseph et al.
(Continued)

OTHER PUBLICATIONS

"3rd Generation Partnership Project, Technical Specification Group Radio Access Network, NR, Radio Resource Control ( RRC) Protocol Specification (Release 15)", 3GPP Draft, Draft Featureset_ 38331-F10, V5. 3rd Generation Partnership Project (3GPP), Mobile Competence Centre, 650, Route Des Lucioles, F-06921 Sophia-Antipolis Cedex, France, May 9, 2018 (May 9, 2018), XP051545941, Retrieved from the Internet: URL: http://www.3gpp.org/ftp/Email%5FDiscussions/RAN2/[RAN2%23101bis]/[101bis%2348][NR]%20UE%20capabilites%20structure/DRAFT%20FeatureSet%5F38331%2Df10%5Fv5%2Ezip. [retrieved on May 9, 2018] p. 110-p. 117.
(Continued)

*Primary Examiner* — Quoc Thai N Vu
(74) *Attorney, Agent, or Firm* — Loza & Loza, LLP

(57) ABSTRACT

Aspects relate to selecting a physical cell identifier (PCI) that a user equipment (UE) uses to obtain a timing reference for a mobility measurement. A serving base station (BS) associated with multiple cells may select a set of these cells as candidate cells for a UE and send to the UE a set of candidate PCIs associated with those cells (e.g., one PCI for each cell). The BS may select a subset of the candidate cells to serve to the UE and indicate to the UE the corresponding subset of PCIs. The UE may select a PCI from the set of candidate PCIs (or from the subset of PCIs) to use for obtaining a timing reference for a synchronization signal block (SSB) measurement. The UE may select a PCI based on a defined rule. The UE may select a PCI based on signaling from the BS.

30 Claims, 15 Drawing Sheets

(51) Int. Cl.
*H04W 56/00* (2009.01)
*H04W 36/08* (2009.01)
*H04W 76/11* (2018.01)

(52) U.S. Cl.
CPC ......... *H04W 36/08* (2013.01); *H04W 56/001* (2013.01); *H04W 76/11* (2018.02)

(58) Field of Classification Search
CPC ... H04W 36/38; H04W 48/16; H04W 56/001; H04W 56/0015; H04W 76/11
See application file for complete search history.

(56) References Cited

U.S. PATENT DOCUMENTS

| | | | | |
|---|---|---|---|---|
| 2020/0252823 | A1* | 8/2020 | Kim | H04W 76/20 |
| 2021/0067994 | A1* | 3/2021 | Chen | H04L 5/0094 |
| 2021/0360464 | A1* | 11/2021 | Zheng | H04W 52/0209 |
| 2022/0123878 | A1* | 4/2022 | Takada | H04L 5/0066 |

OTHER PUBLICATIONS

International Search Report and Written Opinion—PCT/US2021/022751—ISA/EPO—dated Jun. 28, 2021.
Qualcomm Incorporated: "Summary of Offline Discussion#40: CR to Capture UseServingCellTimingForSync and assocatedSSB", 3GPP Draft, 3GPP TSG-RAN WG2 Meeting #102, R2-1809139—Offline#40—Summary of Offline Discussion#40: CR to Capture UseServingCellTimingForSync and assocatedSSB, 3rd Generation Partnership Project (3GPP), Mobile Competence Centre, 650, Route Des, vol. RAN WG2, No. Busan, Korea, May 21, 2018-May 25, 2018, May 25, 2018 (May 25, 2018), XP051503580, pp. 1-13, Retrieved from the Internet: URL: http://www.3gpp.org/ftp/tsg%5Fran/WG2%5FRL2/TSGR2%5F102/Docs/R2%2D1809139%2Ezip, [retrieved on May 25, 2018], the whole document.

* cited by examiner

REFERENCE MEASUREMENT TIMING SELECTION FOR WIRELESS COMMUNICATION MOBILITY

CROSS-REFERENCE TO RELATED APPLICATIONS

The present application for patent claims priority to and the benefit of U.S. Provisional Application No. 63/015,365, titled "REFERENCE MEASUREMENT TIMING SELECTION FOR WIRELESS COMMUNICATION MOBILITY" filed Apr. 24, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to selecting reference measurement timing for a mobility operation.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS.

A network may support mobility operations that enable a UE to communicate with one or more a nearby cells. For example, as a UE moves across a service area of the network, handovers may take place such that the UE initially communicates with at least one cell and then communicates with at least one other cell.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, the disclosure provides a method for wireless communication at a user equipment. The method may include receiving, from a base station, a first indication of a set of candidate physical cell identifiers (PCIs) for the user equipment, selecting a first PCI from the set of candidate PCIs, determining a timing reference for a synchronization signal block (SSB) measurement from downlink receive timing associated with the first PCI, and conducting the SSB measurement using the timing reference.

In some examples, the disclosure provides a user equipment that includes a transceiver, a memory, and a processor communicatively coupled to the transceiver and the memory. The processor and the memory may be configured to receive, from a base station via the transceiver, a first indication of a set of candidate physical cell identifiers (PCIs) for the user equipment, select a first PCI from the set of candidate PCIs, determine a timing reference for a synchronization signal block (SSB) measurement from downlink receive timing associated with the first PCI, and conduct the SSB measurement using the timing reference.

In some examples, the disclosure provides a user equipment. The user equipment may include means for receiving, from a base station, a first indication of a set of candidate physical cell identifiers (PCIs) for the user equipment, means for selecting a first PCI from the set of candidate PCIs, means for determining a timing reference for a synchronization signal block (SSB) measurement from downlink receive timing associated with the first PCI, and means for conducting the SSB measurement using the timing reference.

In some examples, the disclosure provides an article of manufacture for use by a user equipment. The article of manufacture may include a non-transitory computer-readable medium having stored therein instructions executable by one or more processors of the user equipment to receive, from a base station, a first indication of a set of candidate physical cell identifiers (PCIs) for the user equipment, select a first PCI from the set of candidate PCIs, determine a timing reference for a synchronization signal block (SSB) measurement from downlink receive timing associated with the first PCI, and conduct the SSB measurement using the timing reference.

In some examples, the disclosure provides a method for wireless communication at a base station. The method may include transmitting a physical cell identifier (PCI) selection indication to a user equipment. The PCI selection indication may specify a selection procedure for selecting a timing reference associated with a PCI for a synchronization signal block (SSB) measurement. The method may also include receiving a measurement report from the user equipment after transmitting the PCI selection indication, and conducting a mobility operation for the user equipment based on the measurement report.

In some examples, the disclosure provides a base station that includes a transceiver, a memory, and a processor communicatively coupled to the transceiver and the memory. The processor and the memory may be configured to transmit a physical cell identifier (PCI) selection indication to a user equipment via the transceiver. The PCI selection indication may specify a selection procedure for selecting a timing reference associated with a PCI for a synchronization signal block (SSB) measurement. The processor and the memory may also be configured to receive a measurement report from the user equipment via the transceiver after transmitting the PCI selection indication, and conduct a mobility operation for the user equipment based on the measurement report.

In some examples, the disclosure provides a base station. The base station may include means for transmitting a physical cell identifier (PCI) selection indication to a user equipment. The PCI selection indication may specify a selection procedure for selecting a timing reference associated with a PCI for a synchronization signal block (SSB) measurement. The base station may also include means for receiving a measurement report from the user equipment after transmitting the PCI selection indication, and means for conducting a mobility operation for the user equipment based on the measurement report.

In some examples, the disclosure provides an article of manufacture for use by a base station. The article of manufacture may include a non-transitory computer-readable medium having stored therein instructions executable by one or more processors of the base station to transmit a physical cell identifier (PCI) selection indication to a user equipment.

The PCI selection indication may specify a selection procedure for selecting a timing reference associated with a PCI for a synchronization signal block (SSB) measurement. The computer-readable medium may also have stored therein instructions executable by one or more processors of the base station to receive a measurement report from the user equipment after transmitting the PCI selection indication, and to conduct a mobility operation for the user equipment based on the measurement report.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
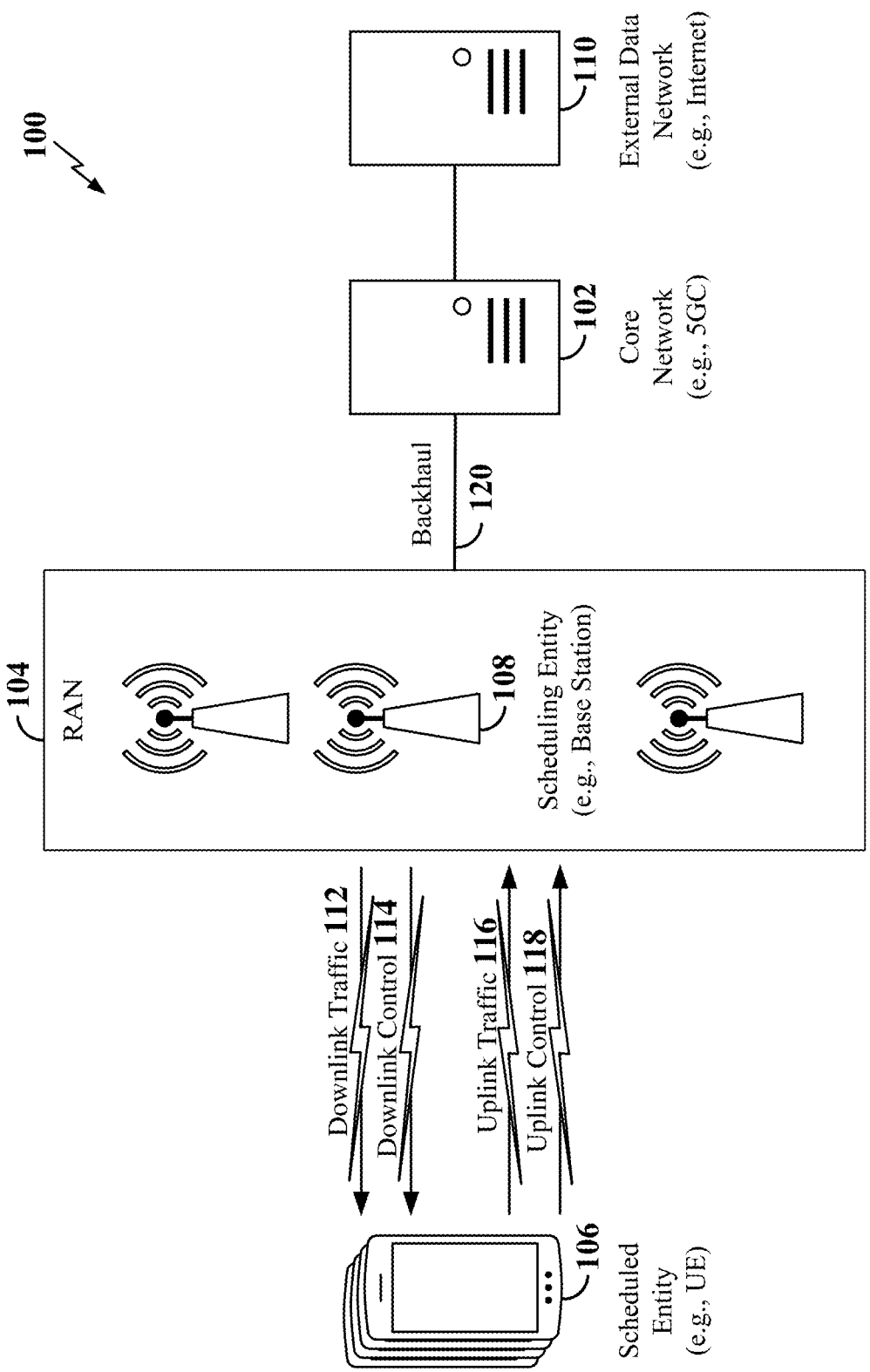
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to determining timing to be used for a reference measurement for a mobility operation. In some networks, a UE may concurrently connect to several cells and/or several transmission and reception points (TRPs). For example, a base station may be configured to serve several cells or may be configured with several remotely deployed TRPs (e.g., each of which includes a radio head and at least one antenna) to extend the coverage of the base station. Each cell or transmission and reception point (TRP) may use a unique (e.g., locally unique) physical cell identifier (PCI).

The base station may configure the UE with a set of candidate PCIs (e.g., the PCIs of nearby cells and/or TRPs that are candidates for serving the UE). In addition, the base station may select a subset of the candidate PCIs and send an indication of this subset to the UE. For example, based on signal measurements made by the UE and reported to the base station, the base station may determine that a particular (e.g., a specific) subset of cells and/or TRPs are best suited for serving the UE at this time. This selection may be based on different criteria in different scenarios. As one example, the base station may select the number of PCIs to be included in the subset based on current traffic requirements for the UE. As another example, the base station may select the PCIs to include in the subset based on the received signal strengths measured by the UE (e.g., the PCIs of the cells and/or TRPs associated with the four highest received signal strengths may be included in the subset).

The disclosure relates in some aspects to selecting a PCI of a set of candidate PCIs that the UE will use to determine a timing reference for a mobility measurement. For example, the UE may select a PCI from the subset of PCIs identified by the base station and measure a downlink signal based on this PCI. The UE may then determine a timing reference from the measured downlink signal and use the timing reference for a synchronization signal block (SSB) measurement. In some examples, the UE may select the PCI based on a defined rule. In some examples, the UE may select the PCI based on signaling from the serving base station.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated.

Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
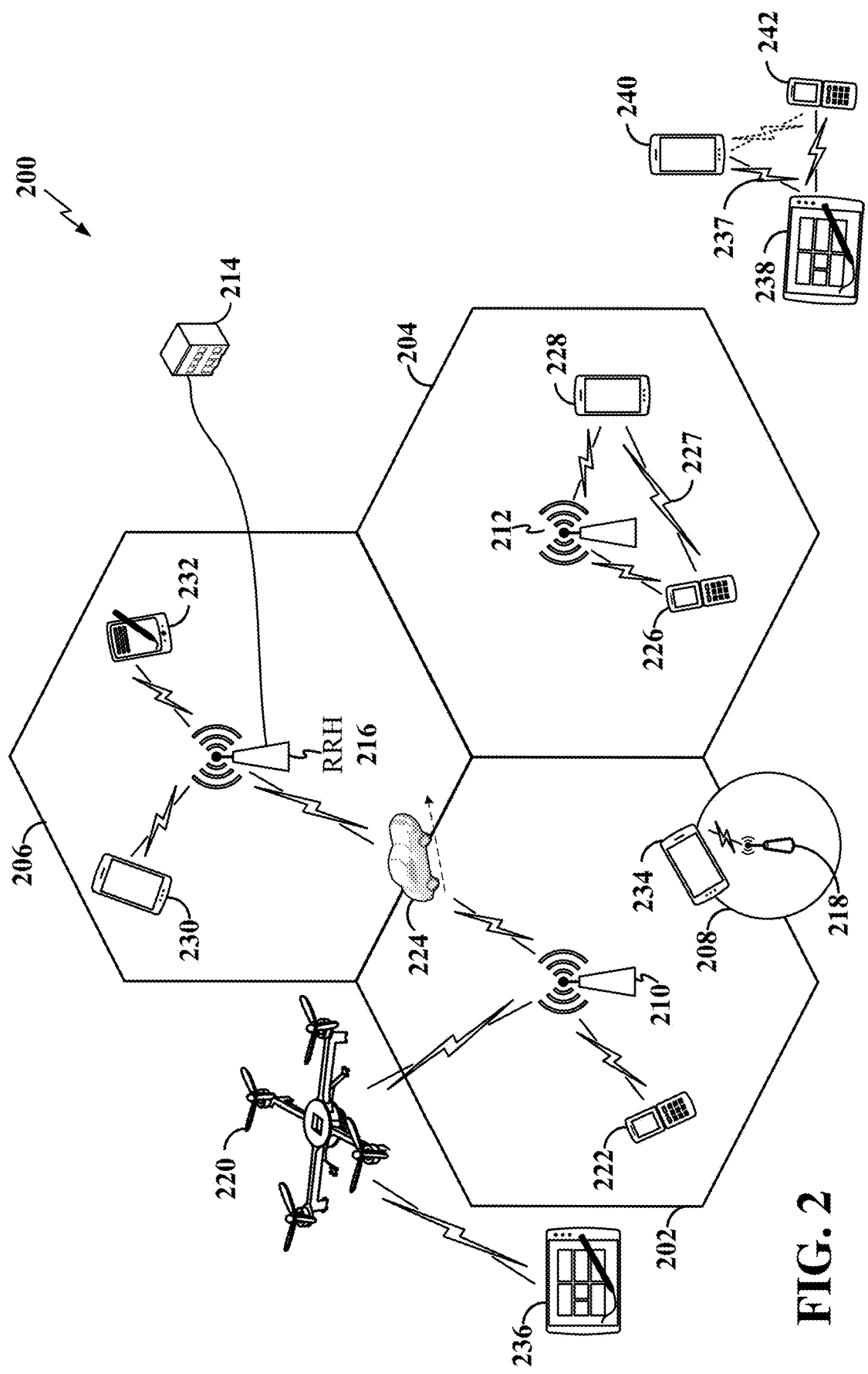
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
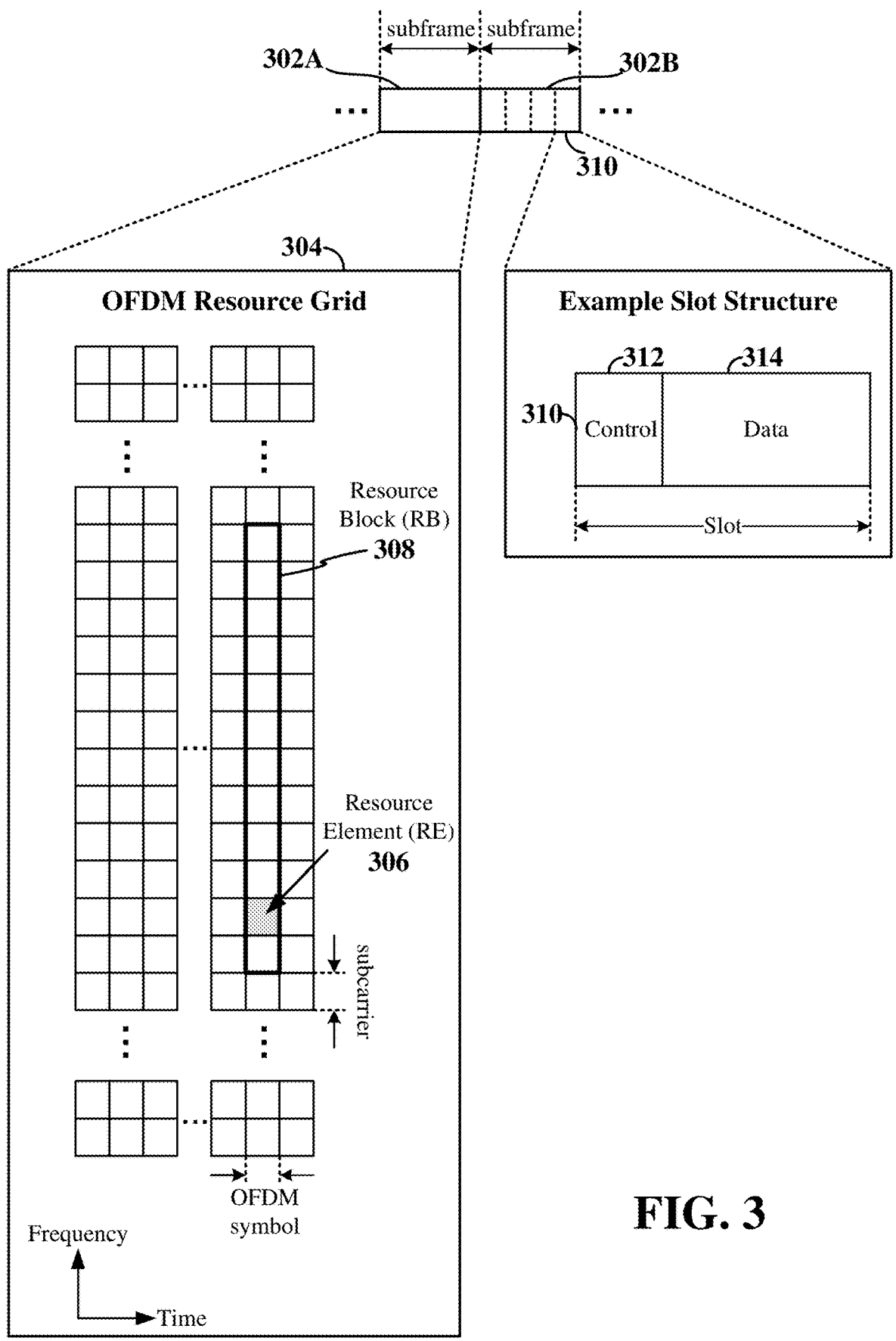
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described herein, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 13 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels.

Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

As the SI may change over time, the scheduling entity may send paging messages that indicate a change in the SI. Accordingly, a UE may periodically monitor a paging channel for these and other paging messages. If a paging message indicates that the SI has changed, the UE monitors a broadcast channel or some other designated channel for the new SI.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., an Rx V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TB S), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4A:
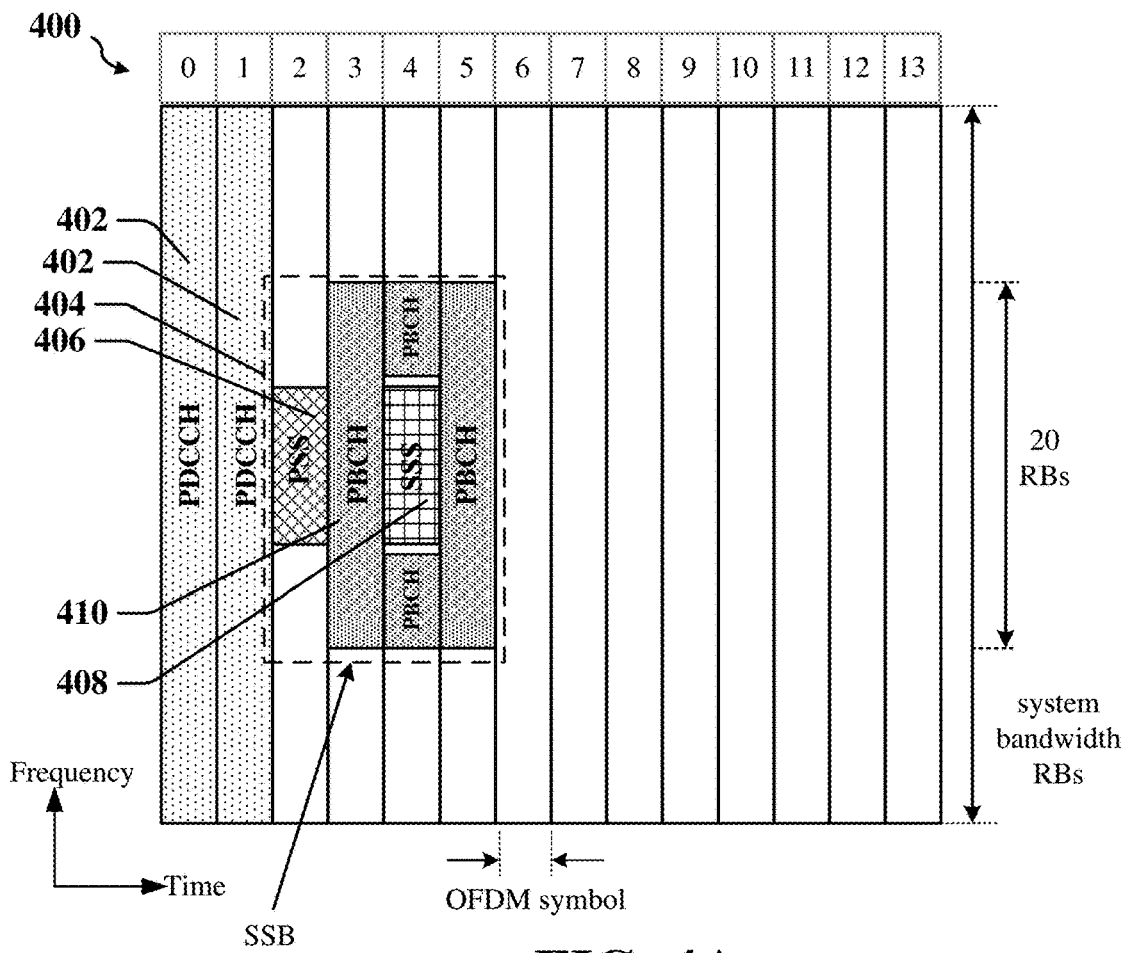
FIG. 4A is a diagram illustrating an example of a frame structure of synchronization signals for use in a wireless communication network according to some aspects.

FIG. 4A illustrates an example 400 of various downlink channels within a subframe of a frame including channels used for initial access and synchronization. As shown in FIG. 4A, a physical downlink control channel (PDCCH) 402 is transmitted in at least two symbols (e.g., symbol 0 and symbol 1) and may carry DCI within at least one control channel element (CCE), with each CCE including nine RE groups, and each RE group (REG) including four consecutive REs in an OFDM symbol. Additionally, FIG. 4A illustrates an exemplary synchronization signal block (SSB) 404 that may be periodically transmitted by a base station or gNB. The SSB 404 carries synchronization signals PSS 406 and SSS 408 and broadcast channels (PBCH) 410. In this example, the SSB 404 contains one PSS symbol (shown in symbol 2), one SSS symbol (shown in symbol 4) and two PBCH symbols (shown in symbols 3 and 5). The PSS and SSS combination may be used to identify physical cell identities. A UE uses the PSS to determine subframe/symbol timing and a physical layer identity. The SSS is used by a UE to determine a physical layer cell identity group number and radio frame timing. Based on the physical layer identity and the physical layer cell identity group number, the UE can determine a physical cell identifier (PCI). Also, based on the PCI, the UE can determine the locations of the aforementioned DMRS. The physical broadcast channel (PBCH), which carries a master information block (MIB), is logically grouped with the PSS and SSS to form the synchronization signal; i.e., the SSB 404. The MIB provides a number of RBs in the system bandwidth and a system frame number (SFN).

Figure 4B:
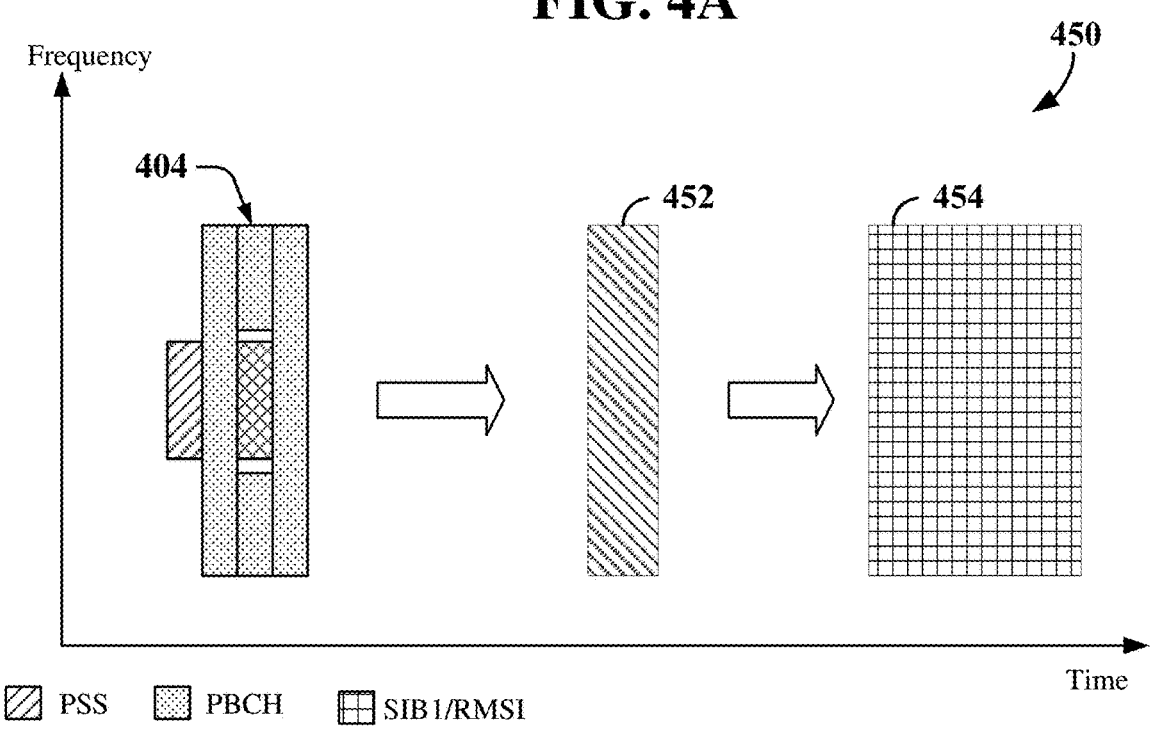
FIG. 4B is a diagram illustrating an example of a portion of a frame or subframe structure with various channels and associated messages for use in a wireless communication network according to some aspects.

FIG. 4B is a diagram illustrating various broadcast information 450 related to initial cell access according to some examples. The broadcast information 450 may be transmitted by a RAN node (e.g., a base station, such as an eNB or gNB) on resources (e.g., time-frequency resources) allocated for the transmission of the broadcast information 450 in a cell. The broadcast information 450 includes the SSB 404 illustrated in FIG. 4A. It is noted that the PBCH in SSB 404 includes the MIB carrying various system information (SI) including, for example, a cell barred indication, the subcarrier spacing, the system frame number, and scheduling information for a CORESET0 452. For example, the PBCH in the SSB 404 may include scheduling information indicating time-frequency resources allocated for a CORESET0 452. In some examples, the CORESET 0 452 may be transmitted within the first four symbols (e.g., within a control region) of a slot. In addition, the CORESET0 452 carries a PDCCH with DCI that contains scheduling information for scheduling a SIB1 454. The SIB1 454 is carried within a physical downlink shared channel (PDSCH) within a data region of a slot. In addition, the SIB1 454 may be referred to as RMSI and includes, for example, a set of radio resource parameters providing network identification and configuration. For example, the set of radio resource parameters may include a bandwidth (e.g., number of BWPs) on which a UE may communicate with a base station.

The MIB in the PBCH may include system information (SI), along with parameters for decoding a SIB (e.g., SIB1). Examples of SI transmitted in the MIB may include, but are not limited to, a subcarrier spacing, system frame number, a configuration of a PDCCH control resource set (CORESET) (e.g., PDCCH CORESET0), and a search space for SIB1. Examples of SI transmitted in the SIB1 may include, but are not limited to, a random access search space, downlink configuration information, and uplink configuration information. The MIB and SIB1 together provide the minimum SI for initial access.

A brief summary of an example of an initial access procedure for a UE using the above information follows. As discussed above, a BS may transmit synchronization signals (e.g., including PSS and SSS) in the network to enable UEs to synchronize with the BS, as well as SI to facilitate initial network access. A UE attempting to access a RAN may perform an initial cell search by detecting a PSS from a BS (e.g., the PSS of a cell of the BS) of the RAN. As discussed above, the PSS may enable the UE to synchronize to period timing of the BS and may indicate a physical layer identity value assigned to the cell. The UE may also receive an SSS from the BS that enables the UE to synchronize on the radio frame level with the cell. The SSS may also provide a cell identity value, which the UE may combine with the physical layer identity value to determine a PCI of the cell.

Wireless communication networks such as NR networks may support carrier aggregation in a multi-cell transmission environment where, for example, different base stations and/or different transmission and reception points (TRPs) may transmit on different component carriers. In some aspects, the term component carrier may refer to a carrier frequency (or band) utilized for communication within a cell. In some examples, different TRPs may be associated with a single serving cell (e.g., a single base station). In some examples, different TRPs may be associated with different serving cells (e.g., different base stations may employ different TRPs).

Figure 5:
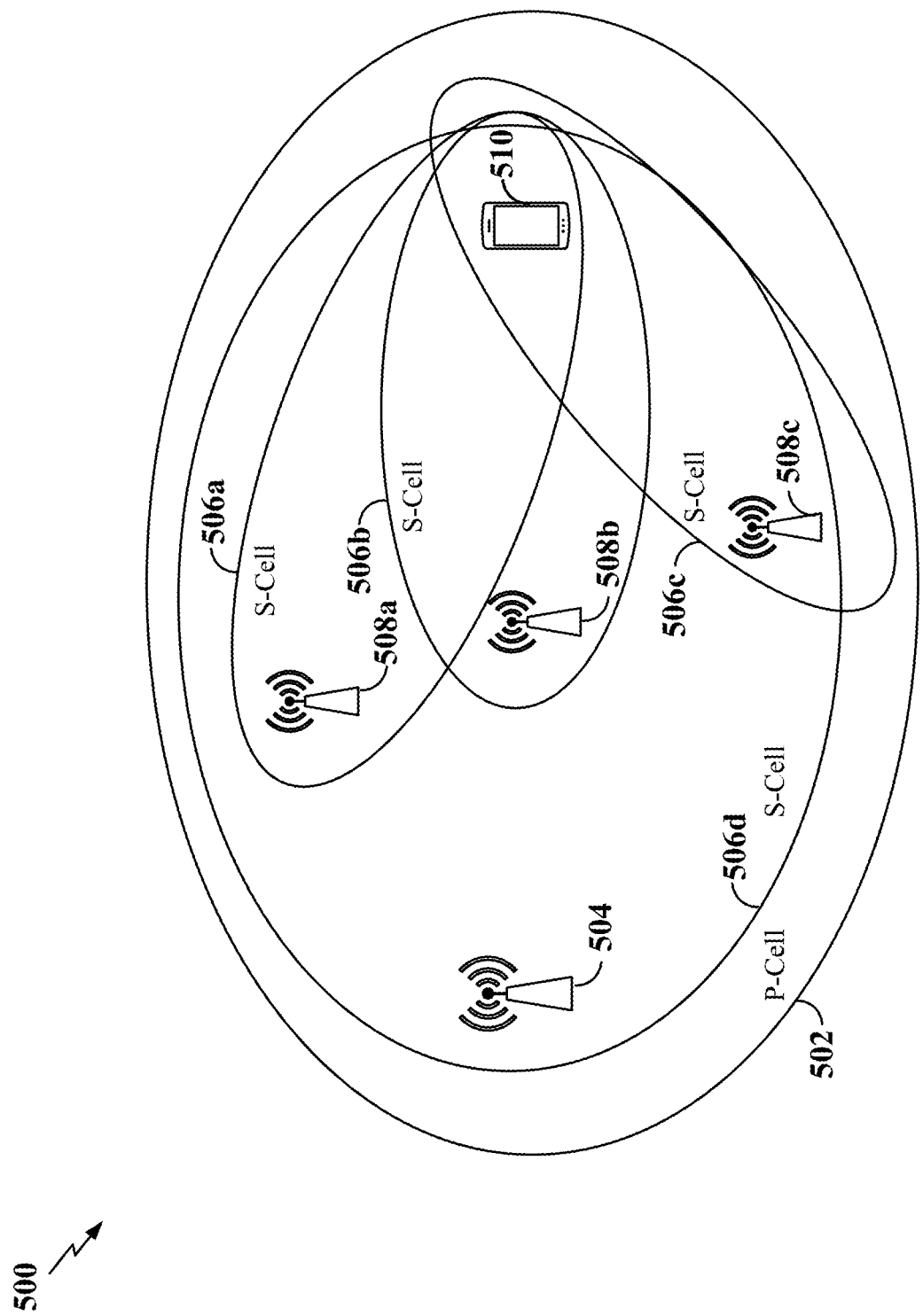
FIG. 5 is a diagram of an example of multiple serving cells according to some aspects.

An example of a multi-cell transmission environment 500 is shown in FIG. 5. The multi-cell transmission environment 500 includes a primary serving cell (PCell) 502 and one or more secondary serving cells (SCells) 506a, 506b, 506c, and 506d. The PCell 502 may be referred to as the anchor cell that provides a radio resource control (RRC) connection to a UE (e.g., the UE 510). In some examples, the PCell and one or more of the SCells may be co-located. For example, a TRP for the PCell and a TRP for an SCell may be installed at the same location.

When carrier aggregation is used in the multi-cell transmission environment 500, one or more of the SCells 506a-506d may be activated or added to the PCell 502 to form the serving cells serving the UE 510. In this case, each of these serving cells corresponds to a component carrier (CC). The CC of the PCell 502 may be referred to as a primary CC, and the CC of an SCell (e.g., SCell 506a-506d) may be referred to as a secondary CC. Each of the PCell 502 and the SCells 506a-506d may be served by a respective base station or scheduling entity as described in FIGS. 1 and 2. In the example of FIG. 5, the PCell 502 is served by the base station 504 and the SCells 506*a*-506*c* are each served by a respective base station 508*a*-508*c*. In addition, the SCell 506*d* is co-located with the PCell 502. For example, the base station 504 may include multiple TRPs, each supporting a different carrier. The coverage of the PCell 502 and the coverage of the SCell 506*d* may differ as shown in FIG. 5. For example, component carriers in different frequency bands may experience different path loss and, thus, provide different coverage.

In some examples, the PCell 502 may utilize a first radio access technology (RAT), such as LTE, while one or more of the SCells 506 may utilize a second RAT, such as NR. In this case, the multi-cell transmission environment may be referred to as a multi-RAT-dual connectivity (MR-DC) environment. In some examples, the PCell 502 may be a low band cell, and the SCells 506 may be high band cells. A low band (LB) cell uses a CC in a frequency band lower than that of the high band cells. For example, the high band cells may use a mmWave CC, and the low band cell may use a CC in a band (e.g., sub-6 GHz band) that is lower than mmWave. In general, a cell using a mmWave CC can provide greater bandwidth than a cell using a low band CC. In addition, when using above-6 GHz frequency (e.g., mmWave) carriers, beamforming may be used to transmit and receive signals.

In some scenarios, the base station 504 may add/remove one or more of the SCells 506*a*-506*d* to/from a set of CCs. For example, as the UE 510 moves or as channel conditions or data requirements change over time, the UE 510 may be better served by a different SCell. Thus, the base station 504 may elect to use a different SCell for the set of CCs to, for example, improve the reliability of a connection to the UE 510 and/or increase the data rate for such a connection.

In addition, the UE 510 may be handed over from the PCell 502 to another PCell. For example, as the UE 510 moves or as channel conditions or data requirements change over time, the UE 510 may be better served by a different PCell (e.g., a PCell that is served by a different base station).

To enable a UE to be handed off between cells (inter-cell mobility), a base station may collect measurement reports from its served UEs. These measurement reports may be based on UE measurements of the signal quality (e.g., signal strength) of signals received from nearby cells. Based on these signal quality measurements, base station may identify the best candidate cells for the UE.

For some types of mobility measurements, the UE may use a timing reference (e.g., of a cell) to measure a signal from a cell. For example, in NR, a protocol Layer 3 (hereafter simply referred to as L3) mobility measurement may be based on an SSB measurement timing configuration (SMTC). In some examples, the SMTC may specify a time window, along with SSB positions and slots within the time window, that a UE can use to measure the SSB of a neighbor cell for mobility purposes.

In some examples, the SMTC may be based on a timing reference of a cell. For example, in NR, the following timing references may be used for a change in a primary cell (PCell), a change in a primary secondary cell (PSCell), or the addition of a secondary cell (SCell). For an NR PCell change, the SMTC may be based on the timing reference of a source PCell. For an NR PSCell change, the SMTC may be based on the timing reference of a source PSCell. For an NR SCell addition, the SMTC may be based on the timing of a SpCell of an associated cell group. An SpCell refers to either a PCell (e.g., a Pcell of an MCG) or a PSCell (e.g., of an SCG).

In some examples, inter-cell mobility in NR involves operations at different protocol layers. Protocol Layer 1 inter-cell mobility may be referred to herein as L1 inter-cell mobility. Protocol Layer 2 inter-cell mobility may be referred to herein as L2 inter-cell mobility. L1 and L2 inter-cell mobility may involve two different modes of operation in some examples.

In a first mode of operation (mode 1), a serving cell is configured with multiple TRPs. These TRPs may be at different locations. In addition, different TRPs may have different PCIs. For a given TRP, the corresponding PCI may be carried by the SSB transmitted by the TRP as discussed above.

Figure 6:
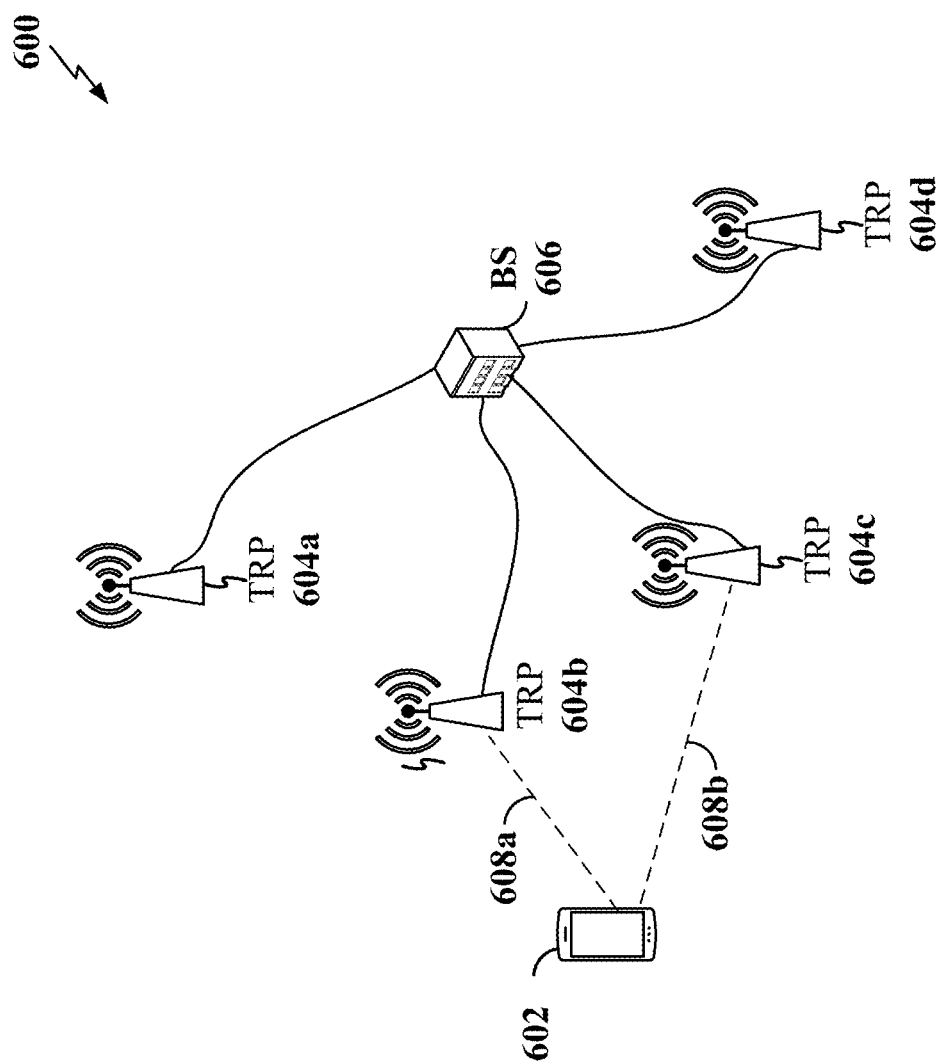
FIG. 6 is a diagram of an example of a wireless communication system according to some aspects.

FIG. 6 illustrates an example of a wireless communication system 600 where a UE 602 is served by a set of TRPs (TRP 604*a*, TRP 604*b*, TRP 604*c*, and TRP 604*d*) of a BS 606 associated with a serving cell. In some scenarios, other cells (not shown) may be in the vicinity of the UE 602. In some examples, the UE 602 may correspond to any of the UEs or scheduled entities shown in any of FIGS. 1, 5, 7, 8, 9, and 10. In some examples, each of the TRP 604*a*, TRP 604*b*, TRP 604*c*, and TRP 604*d* may be TRPs of any of the BSs or scheduling entities shown in any of FIGS. 1, 5, 7, 8, 9, and 13.

Each of the TRP 604*a*, the TRP 604*b*, the TRP 604*c*, and the TRP 604*d* may use a unique (e.g., locally unique) PCI. For example, the TRP 604*a* may use a first PCI, the TRP 604*b* may use a second PCI, the TRP 604*c* may use a third PCI, and the TRP 604*d* may use a fourth PCI. These PCIs enable the UE 602 to uniquely identify each corresponding TRP. In some examples, the cells served by the TRPs may be referred to as sub-cells of a serving cell (e.g., a serving cell of the BS 606).

At a given point in time, a UE may be served by a subset of the serving cell's total number of sub-cells (e.g., the cells of the TRPs that have been selected to serve the UE). In addition, the serving cell may change this subset from time to time.

For example, in FIG. 6, the BS 606 that is serving the UE 602 may have selected the four TRPs (TRP 604*a*, TRP 604*b*, TRP 604*c*, and TRP 604*d*) in the vicinity of the UE 602 as candidate sub-cells for the UE 602. In addition, the BS 606 may have configured the UE 602 to be served by two of the TRPs (TRP 604*b* and TRP 604*c*) as represented by a dashed line 608*a* and a dashed line 608*b*. Thus, in this case, the UE 602 may be served by a first sub-cell associated with the TRP 604*b* and a second sub-cell associated with the TRP 604*c*.

In some examples, a decision by a serving cell to change the serving subset for a UE may be based on measurements made by the UE. For example, the UE may be configured to measure L1 metrics (e.g., for each serving TRP, for each candidate TRP, or for some other group of TRPs). The metrics may include, for example, one or more of reference signal received power (RSRP), signal-to-interference-plus-noise ratio (SINR), or reference signal received quality (RSRQ).

Upon determining that a change in the subset is warranted (e.g., if there has been a non-trivial change in the measured metrics with respect to one or more of the TRPs), the serving cell may send an indication of the change (e.g., identifying any PCIs that have been added or removed from the subset) to the UE. In some examples, the serving cell (e.g., a gNB) may send this indication via downlink control information (DCI), via a media access control-control element (MAC-CE), via a radio resource control (RRC) message, via some other type of signaling technique, or via a combination of two or more of these signaling techniques.

In the example of FIG. 6, the BS 606 will send to the UE 602 an indication of the PCIs of the TRPs of the subset. For example, the BS 606 may send to the UE 602 an indication of the PCI of the TRP 604b and the PCI of the TRP 604c.

In a second mode of operation (mode 2), a UE is configured (e.g., by a primary serving cell) with a group of serving cells (e.g., a candidate set of cells). Here, different serving cells have different PCIs (e.g., there is a single PCI per serving cell). For a given serving cell, this PCI may be carried by the SSB transmitted by the serving cell.

Figure 7:
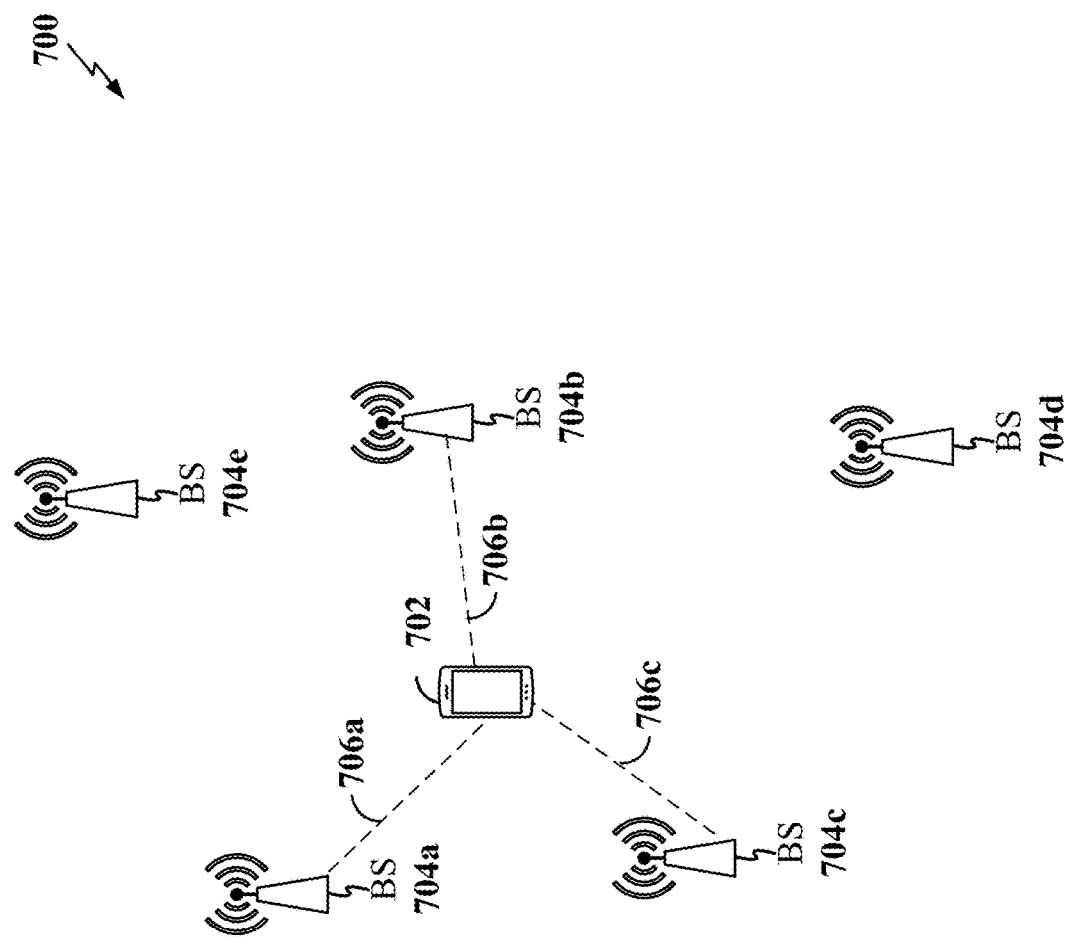
FIG. 7 is a diagram of another example of a wireless communication system according to some aspects.

FIG. 7 illustrates an example of a wireless communication system 700 where a UEs 702 is served by a set of serving cells represented by BS 704a, BS 704b, BS 704c, BS 704d, and BS 704e. In some scenarios, other cells (not shown) may be in the vicinity of the UEs 702. In some examples, the UE 702 may correspond to any of the UEs or scheduled entities shown in any of FIGS. 1, 5, 6, 8, 9, and 10. In some examples, each of the BS 704a, BS 704b, BS 704c, BS 704d, and BS 704e may correspond to any of the BSs or scheduling entities shown in any of FIGS. 1, 5, 6, 8, 9, and 13.

Each of the BS 704a, the BS 704b, the BS 704c, the BS 704d, and the BS 704e may use a unique (e.g., locally unique) PCI. For example, the BS 704a may use a first PCI, the BS 704b may use a second PCI, the BS 704c may use a third PCI, the BS 704d may use a fourth PCI, and the BS 704e may use a fifth PCI. These PCIs enable a UE to uniquely identify each corresponding cell.

At a given point in time, a UE may be served by a subset of the group of serving cells. This subset may change from time to time. For example, one of the serving cells (e.g., a primary serving cell such as a gNB) may select the subset based on L1 reports (e.g., L1 RSRP, SINR, RSRQ) from a UE. The UE may send these reports to a selected set of serving cells or to an anchor serving cell in the group of serving cells in some examples. Upon determining that a change in the subset is warranted (e.g., if there has been a non-trivial change in the measured metrics with respect to one or more measured cells), the primary serving cell may send an indication of the change (e.g., identifying a PCI that have been added or removed from the subset) to the UE as discussed above.

For example, in FIG. 7, the BS 704a (e.g., a primary cell or an anchor cell) that is serving the UE 702 may have selected the five BSs (BS 704a, BS 704b, BS 704c, BS 704d, and BS 704e) in the vicinity of the UE 702 as candidate cells for the UE 702. In addition, the BS 704a may have configured the UE 702 to be served by three of the BSs (BS 704a, BS 704b, BS 704c) as represented by a dashed line 706a, a dashed line 706b, and a dashed line 706c. The BS 704a will therefore send to the UE 702 an indication of the PCIs of the cells of the subset. For example, the BS 704a may send to the UE 702 an indication of the PCI of the BS 704a, the PCI of the BS 704b, and the PCI of the BS 704c.

Thus, in the scenarios of FIG. 6 and FIG. 7, each of the BS 606 and the BS 704a may perform mobility operations in an attempt to ensure that served UEs are being served by the best cells. For example, over time, the BS 606 and the BS 704a may change the set of selected candidate cells/TRPs and/or serving cells/TRPs for a particular UE. Such a change may be triggered by, for example, movement of a UE, a change in channel conditions, a change in data throughput requirements, or some other type of operational change.

The disclosure relates in come aspects to mobility operations in a multi-cell environment. For example, a UE that is served by multiple cells, where each cell has its own unique PCI, may select one of these PCIs to use for a timing reference for a mobility measurement.

In some examples, a UE may conduct L3 mobility measurements in a scenario where the UE is served by multiple cells and/or TRPs. In this case, the timing reference used for the L3 mobility measurement may be selected from a set of cells and/or TRPs that are in the neighborhood of the UE. This set of cells and/or TRPs may be referred to herein as a candidate set of cells/TRPs. In addition, the PCIs associated with the candidate set of cells/TRPs may be referred to herein as a set of candidate PCIs. Two examples of selecting the timing reference used for the L3 mobility measurement follow.

In the first example, a timing reference for an L3 mobility measurement (e.g., for an SSB measurement timing configuration (SMTC)) in L1 and/or L2 mobility may be based on the timing reference of one PCI in a subset of PCI(s) that have been selected for serving a UE. In some examples, the subset of PCI(s) is a subset of a set of candidate PCIs for the UE. If there is only one PCI in the subset, the timing reference for the SMTC may be based on the downlink receive timing for this PCI.

If there are multiple PCIs in the subset, the timing reference may be based on one of the PCIs in the subset. Two options for determining which PCI of the subset to use follow. Other techniques for determining which PCI of the subset to use may be used in other examples.

In a first option, the UE determines the PCI to use based on a rule. This rule may take different forms in different implementations.

In some examples, the rule may be a predefined rule (e.g., an implicit rule). In some examples, the rule may be specified by a communication standard such as a 3GPP Technical Specification. In some examples, the rule may be programmed into the wireless communication during initial deployment in a network.

In some examples, the rule may be a defined rule (e.g., a rule that a UE receives from a base station). In some examples, the rule may specify that the UE uses the PCI having the lowest PCI value in the subset of PCIs selected for serving the UE. In some examples, the rule may specify that the UE uses the PCI having the highest PCI value in the subset of PCIs selected for serving the UE. Other rules may be used in other examples.

In a second option, the UE determines the PCI to use based on explicit signaling. For example, a base station (e.g., a gNB) may send to the UE an indication of the PCI that the UE is to use to determine the timing reference. The base station may send this indication via downlink control information (DCI), via a media access control-control element (MAC-CE), via a radio resource control (RRC), via some other type of signaling technique, or via a combination of two or more of these signaling techniques.

Figure 8:
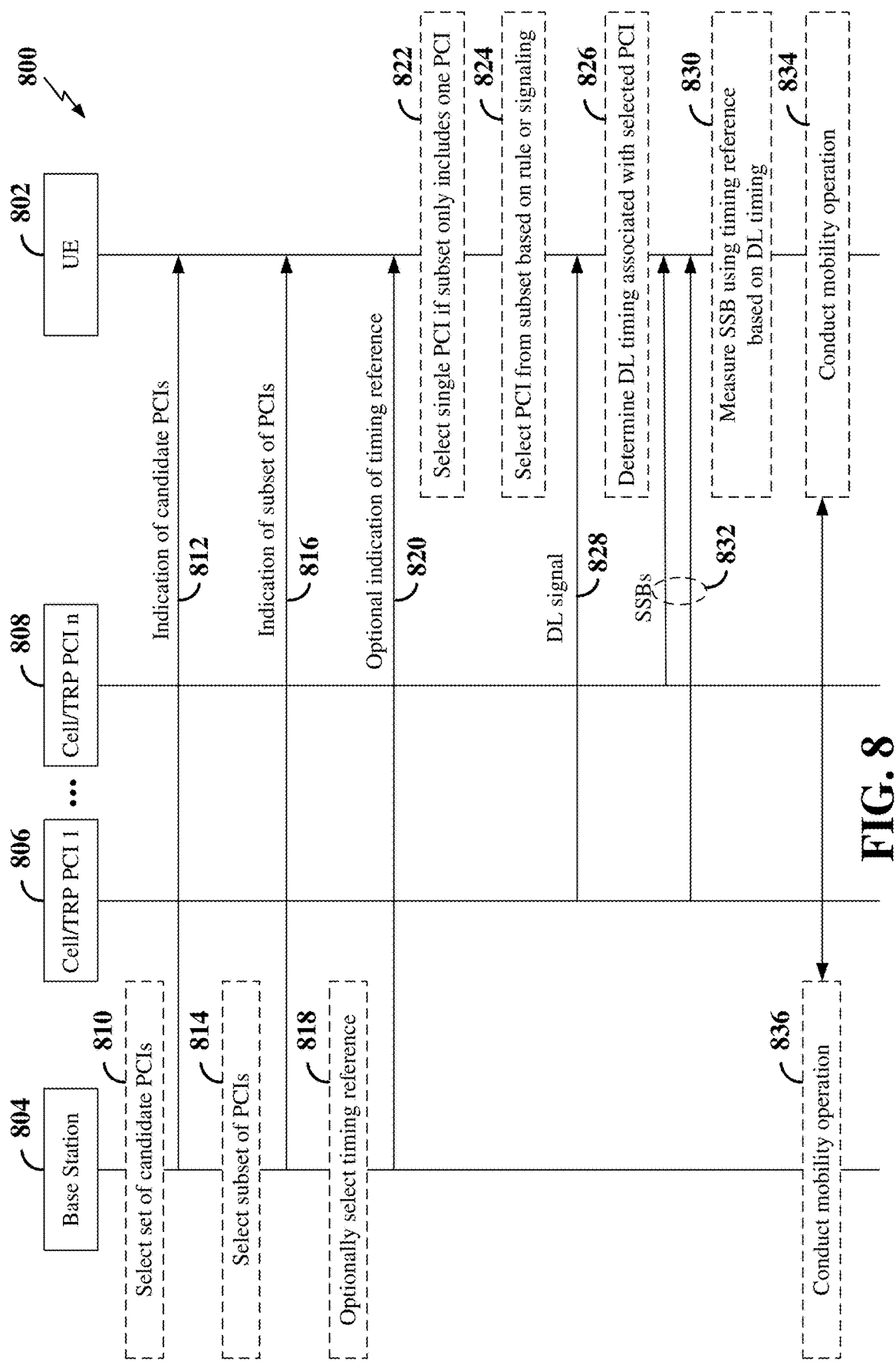
FIG. 8 is a signaling diagram illustrating an example of signaling associated with selecting a timing reference according to some aspects.

FIG. 8 is a signaling diagram 800 illustrating an example of signaling for the first example in a wireless communication system including a UE 802 and a base station (BS) 804 that serves several cells and/or TRPs (e.g., cell/TRP 806 through cell/TRP 808). As discussed herein, each of the cell/TRPs may be associated with a unique PCI. In some examples, the UE 802 may correspond to any of the UEs or scheduled entities shown in any of FIGS. 1, 2, 5, 6, 7, 9, and 10. In some examples, the BS 804 may correspond to any of the base stations or scheduling entities shown in any of FIGS. 1, 2, 5, 6, 7, 9, and 13.

At 810 of FIG. 8, the BS 804 selects a set of candidate PCIs for the UE 802. For example, based on measurement reports received from the UE 802, the BS 804 may identify a set of cells or TRPs in the vicinity of the UE 802. At 812, the BS 804 may transmit an indication of the set of candidate PCIs to the UE 802.

At 814, the BS 804 selects a subset of the set of candidate PCIs to serve the UE 802. For example, based on measurement reports received from the UE 802, the BS 804 may identify a subset of the candidate PCIs that would best serve the UE 802 at this point in time. At 816, the BS 804 may transmit an indication of the subset of PCIs to the UE 802.

At optional 818, the BS 804 may select a timing reference to be used by the UE 802 for SSB measurements. For example, the BS 804 may determine that the UE 802 should use the anchor cell of the UE 802 as the timing reference. At 820, the BS 804 may transmit an indication of the selected timing reference (e.g., the PCI of the anchor cell) to the UE 802.

At 822, if there is only one PCI in the subset, the UE 802 may select that PCI for determining the timing reference to be used by the UE 802 for SSB measurements. Alternatively, at 824, if there are multiple PCIs in the subset, the UE 802 may use a rule (e.g., highest/lowest PCI value) or received signaling (e.g., the PCI signaled at 820) to select the PCI from the subset.

At 826, the UE 802 determines the timing of a received downlink (DL) signal 828 associated with the selected PCI. At 830, the UE 802 measures the SSBs 832 transmitted by one or more cells/TRPs (e.g., from the candidate set of cells/TRPs associated with the set of candidate PCIs) using the timing determined at 826 as the timing reference for the SMTC.

At 834 and 836, the UE 802 and the BS 804 conduct mobility operations. For example, the UE 802 may generate a measurement report based on the SSB measurements at 830 and send the measurement report to the BS 804. Based on this measurement report, the BS 804 may elect to change one or more of: the candidate set of cells/TRPs for the UE 802, the subset of serving cells/TRPs for the UE 802, the anchor cell for the UE 802, or perform some other mobility operation (e.g., handover).

In the second example referred to above, the timing reference used for the Layer 3 mobility measurement may be selected from the set of PCIs (e.g., candidate PCIs) that are assigned to the UE. For example, the timing reference may be selected based on the timing reference of one PCI in the set of candidate PCIs, regardless of which PCIs have (or which PCI has) been selected as a serving PCI. If there is one PCI in the PCI set (e.g., an anchor PCI), this PCI is selected. In some examples, the anchor PCI may be dedicated for broadcast, control, and/or measurement report signaling. In some examples, primary data traffic may be served by other PCIs a subset of PCIs selected to serve the UE.

If there are multiple PCIs in the PCI set, the timing reference may be based on one of PCIs in the PCI set. Two options for determining which PCI of the PCI set to use follow. Other techniques for determining which PCI of the PCI set to use may be employed in other examples.

In a first option, the UE determines the PCI to use based on a rule. This rule may take different forms in different implementations.

In some examples, the rule may be a predefined rule (e.g., an implicit rule). In some examples, the rule may be specified by a communication standard such as a 3GPP Technical Specification. In some examples, the rule may be programmed into the wireless communication during initial deployment in a network.

In some examples, the rule may be a defined rule (e.g., a rule that a UE receives from a base station). In some examples, the rule may specify that the UE uses the PCI having the lowest PCI value in the subset of PCIs selected for serving the UE. In some examples, the rule may specify that the UE uses the PCI having the highest PCI value in the subset of PCIs selected for serving the UE. Other rules may be used in other examples.

In a second option, the UE determines the PCI to use based on explicit signaling. For example, a base station (e.g., a gNB) may send to the UE an indication of the PCI that the UE is to use to determine the timing reference. The base station may send this indication via downlink control information (DCI), via a media access control-control element (MAC-CE), via a radio resource control (RRC), via some other type of signaling technique, or via a combination of two or more of these signaling techniques.

Figure 9:
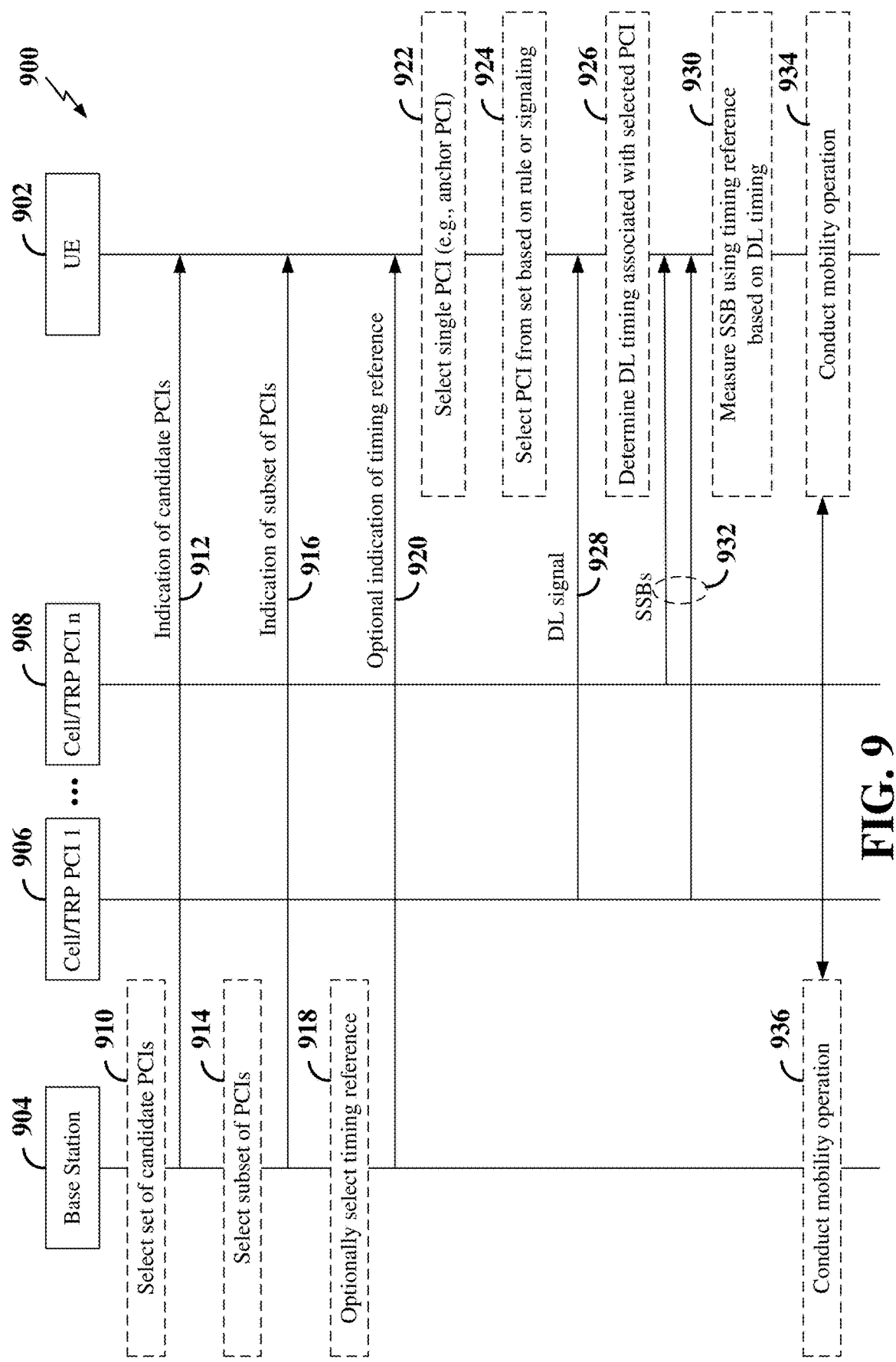
FIG. 9 is a signaling diagram illustrating another example of signaling associated with selecting a timing reference according to some aspects.

FIG. 9 is a signaling diagram 900 illustrating an example of signaling for the first example in a wireless communication system including a UE 902 and a base station (BS) 904 that serves several cells and/or TRPs (e.g., cell/TRP 906 through cell/TRP 908). As discussed herein, each of the cell/TRPs may be associated with a unique PCI. In some examples, the UE 902 may correspond to any of the UEs or scheduled entities shown in any of FIGS. 1, 2, 5, 6, 7, 8, and 10. In some examples, the BS 904 may correspond to any of the base stations or scheduling entities shown in any of FIGS. 1, 2, 5, 6, 7, 8, and 13.

At 910 of FIG. 9, the BS 904 selects a set of candidate PCIs for the UE 902. For example, based on measurement reports received from the UE 902, the BS 904 may identify a set of cells or TRPs in the vicinity of the UE 902. At 912, the BS 904 may transmit an indication of the set of candidate PCIs to the UE 902.

At 914, the BS 904 selects a subset of the set of candidate PCIs to serve the UE 902. For example, based on measurement reports received from the UE 902, the BS 904 may identify a subset of the candidate PCIs that would best serve the UE 902 at this point in time. At 916, the BS 904 may transmit an indication of the subset of PCIs to the UE 902.

At optional 918, the BS 904 may select a timing reference to be used by the UE 902 for SSB measurements. For example, the BS 904 may determine that the UE 902 should use the anchor cell of the UE 902 as the timing reference. At 920, the BS 904 may transmit an indication of the selected timing reference (e.g., the PCI of the anchor cell) to the UE 902.

At 922, the UE 902 selects a particular PCI (e.g., a specific PCI) from the set of candidate PCIs for determining the timing reference to be used by the UE 902 for SSB measurements. For example, the UE 902 may select the PCI associated with the anchor cell for the UE 902. Alternatively, at 924, the UE 902 may use a rule (e.g., highest/lowest PCI value) or received signaling (e.g., the PCI signaled at 920) to select the PCI from the set of candidate PCIs.

At 926, the UE 902 determines the timing of a received downlink (DL) signal 928 associated with the selected PCI. At 930, the UE 902 measures the SSBs 932 transmitted by one or more cells/TRPs (e.g., from the candidate set of cells/TRPs) using the timing determined at 926 as the timing reference for the SMTC.

At 934 and 936, the UE 902 and the BS 904 conduct mobility operations. For example, the UE 902 may generate a measurement report based on the SSB measurements at 930 and send the measurement report to the BS 904. Based on this measurement report, the BS 904 may elect to change one or more of: the candidate set of cells/TRPs for the UE 902, the subset of serving cells/TRPs for the UE 902, the anchor cell for the UE 902, or perform some other mobility operation (e.g., handover).

Figure 10:
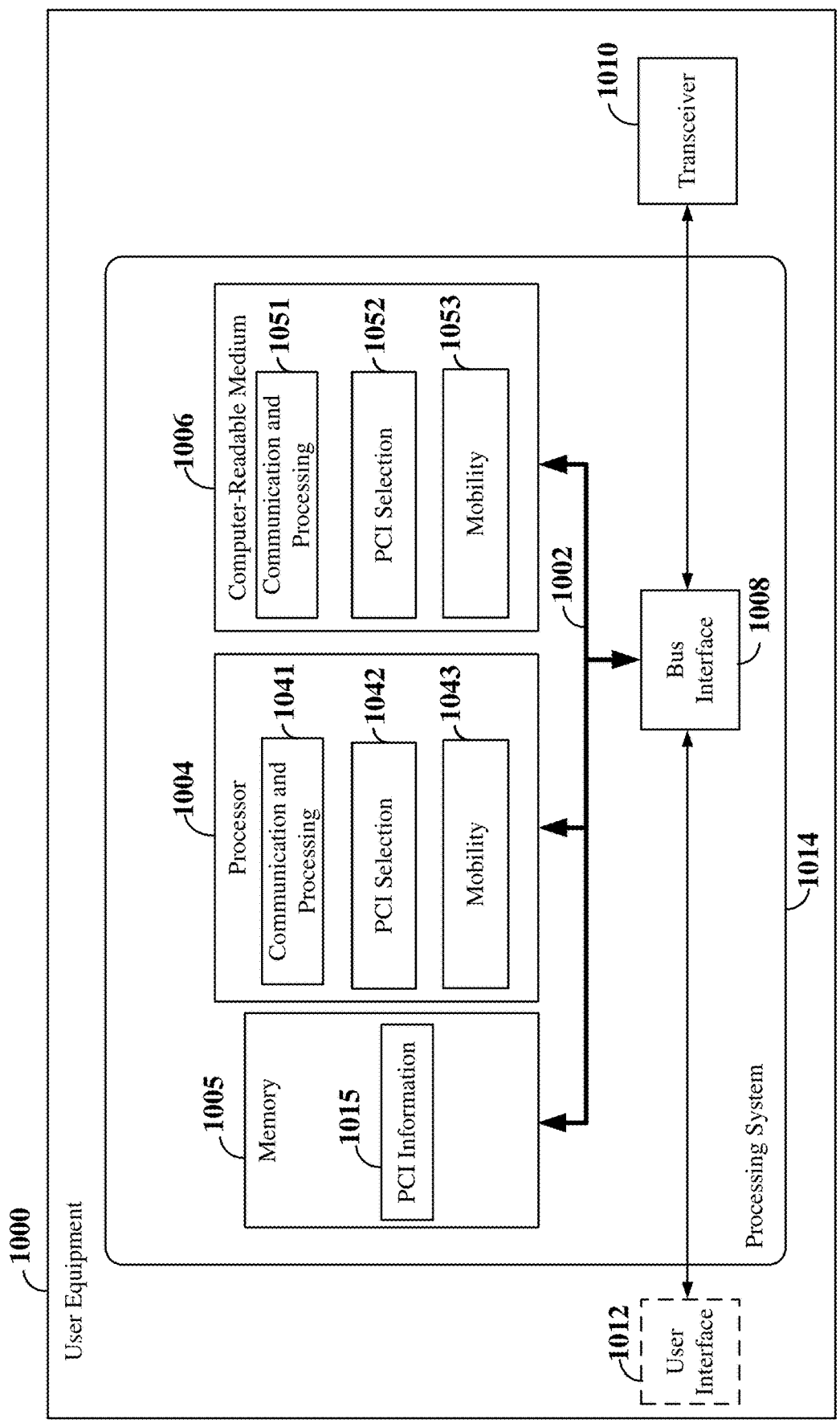
FIG. 10 is a block diagram conceptually illustrating an example of a hardware implementation for a user equipment employing a processing system according to some aspects.

FIG. 10 is a block diagram illustrating an example of a hardware implementation for a UE 1000 employing a processing system 1014. For example, the UE 1000 may be a device configured to wirelessly communicate with a base station, as discussed in any one or more of FIGS. 1-9. In some implementations, the UE 1000 may correspond to any of the UEs or scheduled entities shown in any of FIGS. 1, 2, 5, 6, 7, 8, and 9.

In accordance with various aspects of the disclosure, an element, or any portion of an element, or any combination of elements may be implemented with the processing system 1014. The processing system 1014 may include one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes and procedures described herein.

The processor 1004 may in some instances be implemented via a baseband or modem chip and in other implementations, the processor 1004 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010 and between the bus 1002 and an interface 1030. The transceiver 1010 provides a communication interface or means for communicating with various other apparatus over a wireless transmission medium. The interface 1030 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1030 may include a user interface (e.g., keypad, display, speaker, microphone, joystick). Of course, such a user interface is optional, and may be omitted in some examples, such as an IoT device.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software. For example, the memory 1005 may store PCI information 1015 used by the processor 1004 for the PCI-related operations described herein.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1000 may be configured to perform any one or more of the operations described herein (e.g., as described above in conjunction with FIGS. 1-9 and as described below in conjunction with FIGS. 11-12). In some aspects of the disclosure, the processor 1004, as utilized in the UE 1000, may include circuitry configured for various functions.

The processor 1004 may include communication and processing circuitry 1041. The communication and processing circuitry 1041 may be configured to communicate with a base station, such as a gNB. The communication and processing circuitry 1041 may include one or more hardware components that provide the physical structure that performs various processes related to wireless communication (e.g., signal reception and/or signal transmission) as described herein. The communication and processing circuitry 1041 may further include one or more hardware components that provide the physical structure that performs various processes related to signal processing (e.g., processing a received signal and/or processing a signal for transmission) as described herein. In some examples, the communication and processing circuitry 1041 may include two or more transmit/receive chains. The communication and processing circuitry 1041 may further be configured to execute communication and processing software 1051 included on the computer-readable medium 1006 to implement one or more functions described herein.

In some implementations where the communication involves receiving information, the communication and processing circuitry 1041 may obtain information from a component of the UE 1000 (e.g., from the transceiver 1010 that receives the information via radio frequency signaling or some other type of signaling suitable for the applicable communication medium), process (e.g., decode) the information, and output the processed information. For example, the communication and processing circuitry 1041 may output the information to another component of the processor 1004, to the memory 1005, or to the bus interface 1008. In some examples, the communication and processing circuitry 1041 may receive one or more of signals, messages, other information, or any combination thereof. In some examples, the communication and processing circuitry 1041 may receive information via one or more channels. In some examples, the communication and processing circuitry 1041 may include functionality for a means for receiving. In some examples, the communication and processing circuitry 1041 may include functionality for a means for decoding.

In some implementations where the communication involves sending (e.g., transmitting) information, the communication and processing circuitry 1041 may obtain information (e.g., from another component of the processor 1004, the memory 1005, or the bus interface 1008), process (e.g., encode) the information, and output the processed information. For example, the communication and processing circuitry 1041 may output the information to the transceiver 1010 (e.g., that transmits the information via radio frequency signaling or some other type of signaling suitable for the applicable communication medium). In some examples, the communication and processing circuitry 1041 may send one or more of signals, messages, other information, or any combination thereof. In some examples, the communication and processing circuitry 1041 may send information via one or more channels. In some examples, the communication and processing circuitry 1041 may include functionality for a means for sending (e.g., a means for transmitting). In some examples, the communication and processing circuitry 1041 may include functionality for a means for encoding.

The processor 1004 may include PCI selection circuitry 1042 configured to perform PCI selection-related operations as discussed herein (e.g., as described above in conjunction with FIGS. 8 and 9). The PCI selection circuitry 1042 may include functionality for a means for receiving an indication of a set of candidate PCIs (e.g., functionality as described at 812 and/or 816 of FIG. 8, and/or at 912 and/or 916 of FIG. 9, and/or at block 1102 of FIG. 11). The PCI selection circuitry 1042 may include functionality for a means for selecting a PCI (e.g., functionality as described at 822 and/or 824 of FIG. 8, and/or at 922 and/or 924 of FIG. 9, and/or at block 1104 of FIG. 11). The PCI selection circuitry 1042 may further be configured to execute PCI selection software 1052 included on the computer-readable medium 1006 to implement one or more functions described herein.

The processor 1004 may include mobility circuitry 1043 configured to perform mobility-related operations as discussed herein (e.g., as described above in conjunction with FIGS. 8 and 9). The mobility circuitry 1043 may include functionality for a means for determining a timing reference (e.g., functionality as described at 826 of FIG. 8, and/or at 926 of FIG. 9, and/or at block 1106 of FIG. 11). The mobility circuitry 1043 may include functionality for a means for conducting an SSB measurement (e.g., functionality as described at 830 of FIG. 8, and/or at 930 of FIG. 9, and/or at block 1108 of FIG. 11). The mobility circuitry 1043 may include functionality for a means for generating a measurement report (e.g., functionality as described at 834 of FIG. 8, and/or at 934 of FIG. 9, and/or at block 1110 of FIG. 11). The mobility circuitry 1043 may include functionality for a means for transmitting a measurement report (e.g., functionality as described at 834 of FIG. 8, and/or at 934 of FIG. 9, and/or at block 1112 of FIG. 11). The mobility circuitry 1043 may further be configured to execute mobility software 1053 included on the computer-readable medium 1006 to implement one or more functions described herein.

Figure 11:
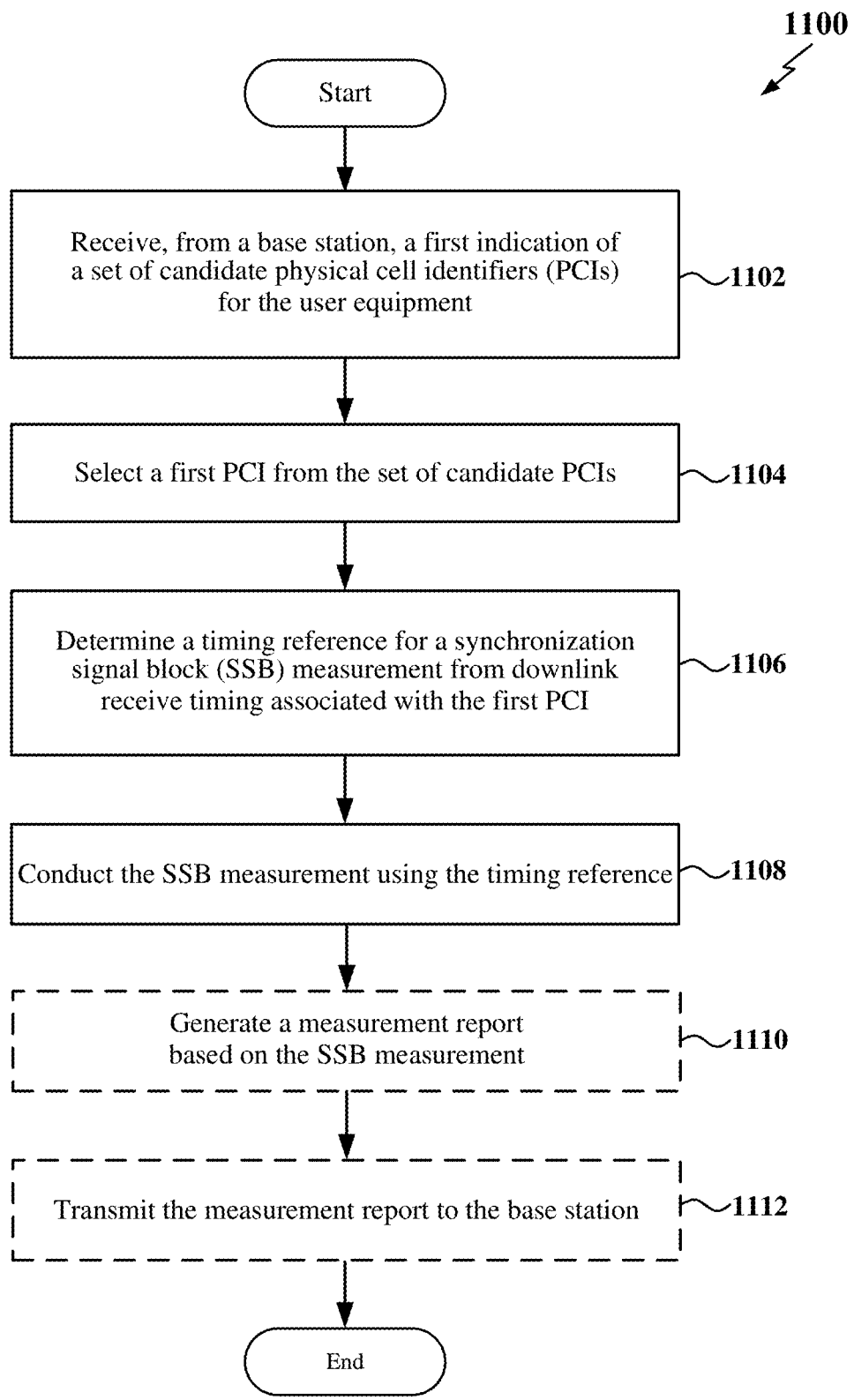
FIG. 11 is a flow chart illustrating an example method involving reference measurement timing selection according to some aspects.

FIG. 11 is a flow chart illustrating an example wireless communication method 1100 according to some aspects. As described below, some or all illustrated features may be omitted in a particular implementation within the scope of the disclosure, and some illustrated features may not be required for implementation of all examples. In some examples, the method 1100 may be carried out by any of the UEs or scheduled entities shown in any of FIGS. 1, 2, 5, 6, 7, 8, 9, and 10. In some examples, the method 1100 may be carried out by the processing system 1014 of FIG. 10. In some examples, the method 1100 may be carried out by any suitable apparatus or means for carrying out the functions or algorithm described below.

At block 1102, a UE may receive, from a base station, a first indication of a set of candidate physical cell identifiers (PCIs) for the user equipment. For example, the communication and processing circuitry 1041 and the transceiver 1010, shown and described above in connection with FIG. 10, may receive a message from a base station that identifies the PCIs of the cells and/or TRPs that have been identified as candidates to serve the UE.

In some examples, a subset of the set of candidate PCIs may include at least one PCI selected for serving the UE. In some examples, the subset only includes the first PCI.

In some examples, a first transmit receive point of a first serving cell for the user equipment may be identified by a second PCI of the set of candidate PCIs and second transmit receive point of the first serving cell may be identified by a third PCI of the set of candidate PCIs. In some examples, a first serving cell for the UE may be identified by a second PCI of the set of candidate PCIs and a second serving cell for the UE may be identified by a third PCI of the set of candidate PCIs.

In some examples, the set of candidate PCIs may include a plurality of PCIs of at least one serving cell for the UE. In some examples, the first PCI may include an anchor PCI for the UE. In some examples, the anchor PCI may be associated with at least one of broadcast traffic, control traffic, measurement report traffic, or any combination thereof. In some examples, one or more PCI of the plurality of candidate PCIs may be associated with data traffic.

In some examples, the set of candidate PCIs may be associated with a plurality of transmit receive points (TRPs) of a serving cell for the UE. In some examples, the serving cell may include a primary cell, a secondary cell, or a primary secondary cell.

In some examples, the set of candidate PCIs may be associated with a plurality of serving cells for the UE. In some examples, the serving cells may include at least one of a primary cell, a secondary cell, or a primary secondary cell.

At block 1104, the UE may select a first PCI from the set of candidate PCIs. For example, the PCI selection circuitry 1042, shown and described above in connection with FIG. 10, may select one of PCIs of the set of candidate PCIs or one of the PCIs of a subset of the set of candidate PCIs. In some examples, if a subset of the set of candidate PCIs specified for the UE only includes one PCI, the PCI selection circuitry 1042 may select that PCI. As another example, if the subset includes multiple PCIs, the PCI selection circuitry 1042 may select one of those PCIs (e.g., based on an implicit rule or based on explicit signaling from the base station).

At block 1106, the UE may determine a timing reference for a synchronization signal block (SSB) measurement from downlink receive timing associated with the first PCI. For example, the mobility circuitry 1043 together with the communication and processing circuitry 1041 and the transceiver 1010, shown and described above in connection with FIG. 10, may measure downlink receive timing associated with the first PCI. In addition, the mobility circuitry 1043 may elect to use the measured downlink receive timing as a timing reference for an SMTC.

At block 1108, the UE may conduct the SSB measurement using the timing reference. For example, the mobility circuitry 1043 together with the communication and processing circuitry 1041 and the transceiver 1010 may use an SMTC based on the timing reference determined at block 1106 to measure L1 metrics from SSB transmissions by neighboring cells/TRPs as discussed herein.

In some examples, the SSB measurement uses an SSB measurement timing configuration (SMTC) that may be based on the timing reference. In some examples, the SSB measurement may include a Protocol Layer 3 measurement.

At optional block 1110, the UE may generate a measurement report based on the SSB measurement. For example, the mobility circuitry 1043 may generate a report that identifies the measured PCIs and their associated L1 metrics.

At optional block 1112, the UE may transmit the measurement report to the base station. For example, the mobility circuitry 1043 together with the communication and processing circuitry 1041 and the transceiver 1010 may transmit the measurement report to a serving cell (e.g., the serving cell if there is only one serving cell, or a primary serving cell if there are multiple serving cells).

In some examples, the process may further include receiving, from the base station, a second indication of a subset of the set of candidate PCIs. In some examples, wherein the selecting the first PCI from the set of candidate PCIs may include selecting the first PCI from the subset. In some examples, the subset only includes the first PCI.

In some examples, the process may further include receiving, from the base station, a physical cell identifier (PCI) selection indication, wherein selecting the first PCI from the set of candidate PCIs may include using the PCI selection indication to select the first PCI. In some examples, the PCI selection indication specifies that the UE is to use a predefined rule to select the first PCI. In some examples, the process may further include receiving, from the base station, a second indication of a subset of the set of candidate PCIs. In some examples, the method may further include using the predefined rule to select the first PCI from the subset. In some examples, the set of candidate PCIs may include a plurality of PCIs of at least one serving cell for the UE and the method may further include using the predefined rule to select the timing reference from the plurality of candidate PCIs. In some examples, the predefined rule specifies that the UE is to select a PCI associated with a lowest PCI value. In some examples, the predefined rule specifies that the UE is to select a PCI associated with a highest PCI value. In some examples, the PCI selection indication specifies that the UE is use to a particular PCI (e.g., a specific PCI) identified by the base station.

In some examples, the process may further include receiving an indication of the particular PCI from the base station. In some examples, receiving the indication of the particular PCI may include receiving the indication of the particular PCI via downlink control information (DCI), a medium access control-control element (MAC-CE), or a radio resource control (RRC) message.

Figure 12:
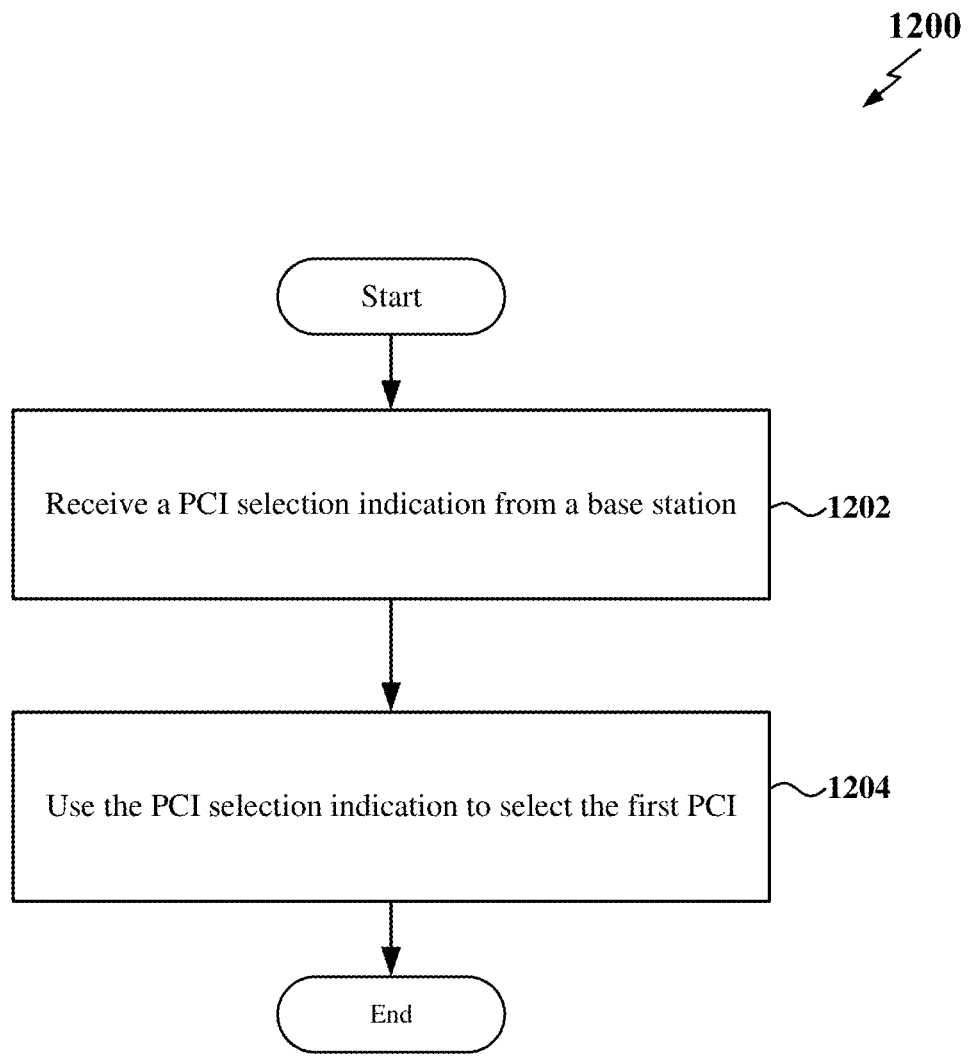
FIG. 12 is a flow chart illustrating an example PCI selection method based on a PCI selection indication according to some aspects.

FIG. 12 is a flow chart illustrating an example wireless communication method 1200 according to some aspects. In some examples, the method 1200 may be implemented in conjunction with (e.g., in addition to or as part of) the method 1100 of FIG. 11. As described below, some or all illustrated features may be omitted in a particular implementation within the scope of the disclosure, and some illustrated features may not be required for implementation of all examples. In some examples, the method 1200 may be carried out by any of the UEs or scheduled entities shown in any of FIGS. 1, 2, 5, 6, 7, 8, 9, and 10. In some examples, the method 1200 may be carried out by the processing system 1014 of FIG. 10. In some examples, the method 1200 may be carried out by any suitable apparatus or means for carrying out the functions or algorithm described below.

At block 1202, a UE may receive a PCI selection indication from a base station. For example, the communication and processing circuitry 1041 and the transceiver 1010, shown and described above in connection with FIG. 10, may receive a DCI that includes the indication via a PDCCH or receive a MAC-CE or an RRC message that includes the indication via a PDSCH.

At block 1204, the UE may use the PCI selection indication to select the first PCI. For example, if the PCI selection indication indicates that the UE is to use a rule for the PCI selection, the PCI selection circuitry 1042, shown and described above in connection with FIG. 10, may select that PCI based on the rule (e.g., select highest or lowest PCI value). As another example, if the PCI selection indication indicates that the UE is to use explicit signaling for the PCI selection, the PCI selection circuitry 1042 may select a PCI based on an indication of the PCI to use received from the base station.

Figure 13:
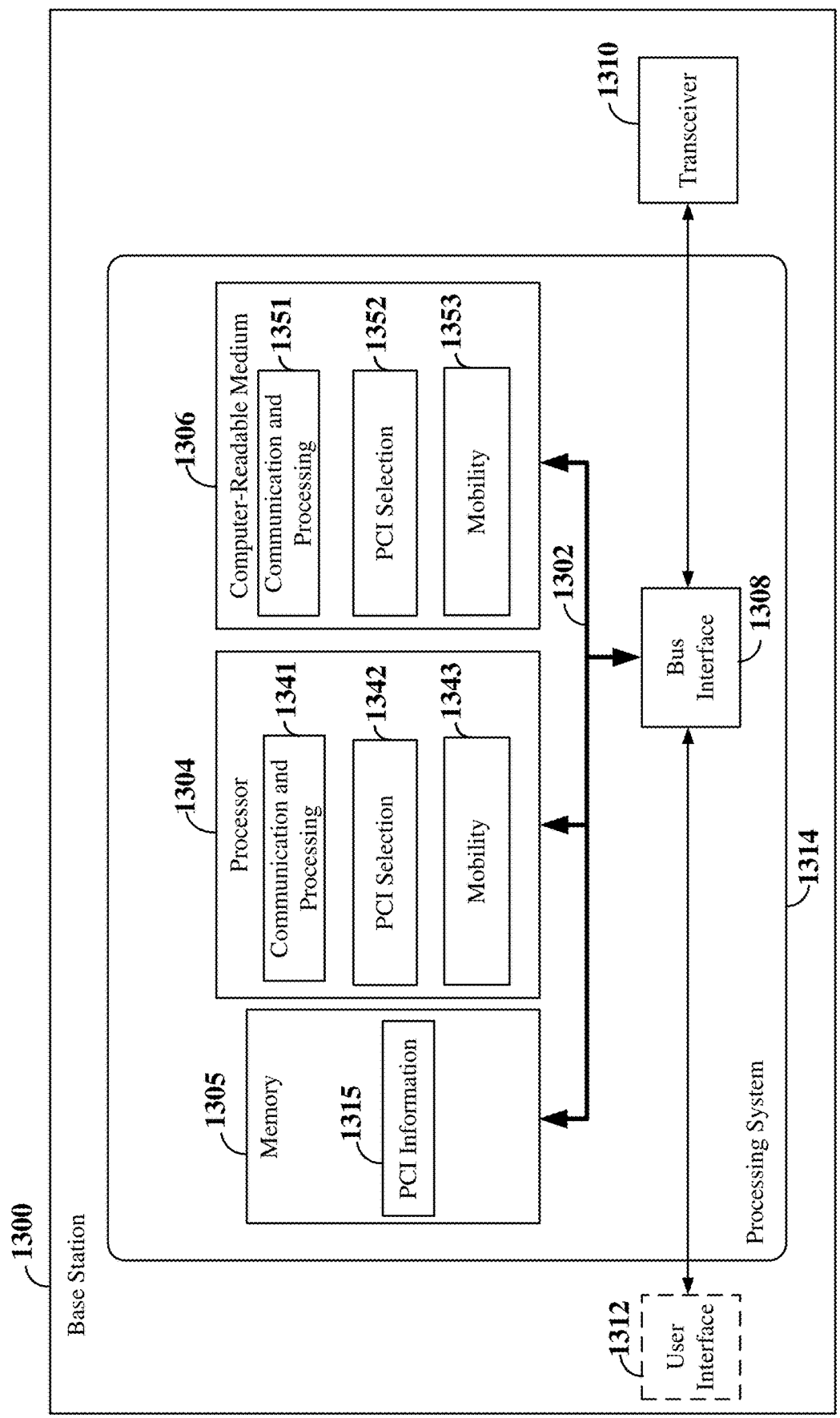
FIG. 13 is a block diagram conceptually illustrating an example of a hardware implementation for a base station employing a processing system according to some aspects.

FIG. 13 is a conceptual diagram illustrating an example of a hardware implementation for base station (BS) 1300 employing a processing system 1314. In some implementations, the BS 1300 may correspond to any of the BSs (e.g., gNBs) or scheduling entities shown in any of FIGS. 1, 2, 5, 6, 7, 8, and 9.

In accordance with various aspects of the disclosure, an element, or any portion of an element, or any combination of elements may be implemented with the processing system 1314. The processing system may include one or more processors 1304. The processing system 1314 may be substantially the same as the processing system 1014 illustrated in FIG. 10, including a bus interface 1308, a bus 1302, memory 1305, a processor 1304, and a computer-readable medium 1306. The memory 1305 may store PCI information 1315 (e.g., PCIs of candidate cells and/or a subset of the candidate cells) used by the processor 1304 in cooperation with the transceiver 1310 for mobility operations. Furthermore, the BS 1300 may include an interface 1330 (e.g., a network interface) that provides a means for communicating with at least one other apparatus within a core network and with at least one radio access network.

The BS 1300 may be configured to perform any one or more of the operations described herein (e.g., as described above in conjunction with FIGS. 1-9 and as described below in conjunction with FIGS. 14-15). In some aspects of the disclosure, the processor 1304, as utilized in the BS 1300, may include circuitry configured for various functions.

The processor 1304 may be configured to generate, schedule, and modify a resource assignment or grant of time-frequency resources (e.g., a set of one or more resource elements). For example, the processor 1304 may schedule time-frequency resources within a plurality of time division duplex (TDD) and/or frequency division duplex (FDD) subframes, slots, and/or mini-slots to carry user data traffic and/or control information to and/or from multiple UEs. The processor 1304 may be configured to schedule resources for the transmission of downlink signals (e.g., SSBs). The processor 1304 may further be configured to schedule resources for the transmission of uplink signals.

In some aspects of the disclosure, the processor 1304 may include communication and processing circuitry 1341. The communication and processing circuitry 1344 may be configured to communicate with a UE. The communication and processing circuitry 1341 may include one or more hardware components that provide the physical structure that performs various processes related to communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. The communication and processing circuitry 1341 may further be configured to execute communication and processing software 1351 included on the computer-readable medium 1306 to implement one or more functions described herein.

The communication and processing circuitry 1341 may further be configured to transmit a message to the UE. For example, the message be included in a MAC-CE carried in a PUSCH, DCI in a PUCCH or PUSCH, a random access message, or an RRC message.

In some implementations wherein the communication involves receiving information, the communication and processing circuitry 1341 may obtain information from a component of the BS 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for receiving. In some examples, the communication and processing circuitry 1341 may include functionality for a means for decoding.

In some implementations wherein the communication involves sending (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for sending (e.g., a means for transmitting). In some examples, the communication and processing circuitry 1341 may include functionality for a means for encoding.

The processor 1304 may include PCI selection circuitry 1342 configured to perform PCI selection-related operations as discussed herein (e.g., as described above in conjunction with FIGS. 8 and 9). The PCI selection circuitry 1342 may include functionality for a means for determining a selection procedure. In addition, the PCI selection circuitry 1342 may include functionality for a means for transmitting a PCI selection indication. For example, the PCI selection circuitry 1342 may determine whether the UE is to use an implicit rule to determine a timing reference for the SSB measurement or use explicit signaling from the BS to determine a timing reference for the SSB measurement. In addition, the PCI selection circuitry 1342 may generate for transmission information that indicates that the implicit rule or a particular PCI indicated by the explicit signaling is to be used by the UE. The PCI selection circuitry 1342 may further be configured to execute PCI selection software 1352 included on the computer-readable medium 1306 to implement one or more functions described herein.

The processor 1304 may include mobility circuitry 1343 configured to perform mobility-related operations as discussed herein (e.g., as described above in conjunction with FIGS. 8 and 9). The mobility circuitry 1343 may include functionality for a means for receiving a measurement report. For example, the mobility circuitry 1343, in cooperation with the communication and processing circuitry 1341, may monitor for measurement report messages on uplink resources (e.g., PUSCH) scheduled for the UE for the transmission of such messages. The mobility circuitry 1343 may include functionality for a means for conducting a mobility operation. For example, the mobility circuitry 1343 may process measurement reports received from one or more UE over time and filter the information in the reports (e.g., calculate an average received power metric over a period of time). In addition, based on this information, the mobility circuitry 1343 may identify the cells/TRPs to be included in a candidate set of cells/TRPs for the UE and/or identify the cells/TRPs that are best suited for serving the UE (e.g., for a period of time until this decision is made again). The mobility circuitry 1343 may further be configured to execute mobility software 1353 included on the computer-readable medium 1306 to implement one or more functions described herein.

Figure 14:
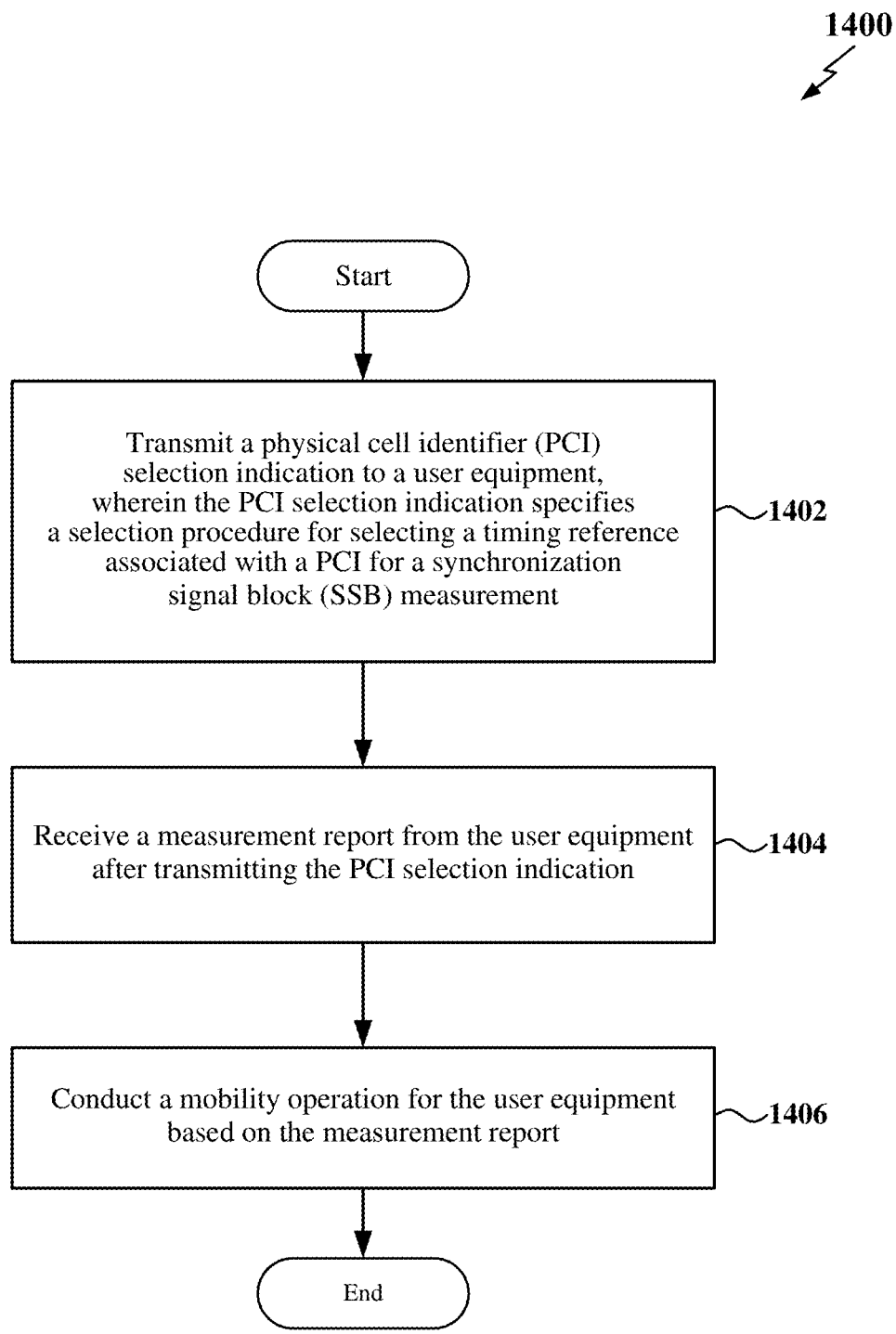
FIG. 14 is a flow chart illustrating an example wireless communication mobility method according to some aspects.

FIG. 14 is a flow chart illustrating an example wireless communication method 1400 according to some aspects. As described below, some or all illustrated features may be omitted in a particular implementation within the scope of the disclosure, and some illustrated features may not be required for implementation of all examples. In some examples, the method 1400 may be carried out by any of the BSs or scheduling entities shown in any of FIGS. 1, 2, 5, 6, 7, 8, 9, and 13. In some examples, the method 1400 may be carried out by the processing system 1314 of FIG. 13. In some examples, the method 1400 may be carried out by any suitable apparatus or means for carrying out the functions or algorithm described below.

At block 1402, a BS may transmit a physical cell identifier (PCI) selection indication to a user equipment, wherein the PCI selection indication specifies a selection procedure for selecting a timing reference associated with a PCI for a synchronization signal block (SSB) measurement. For example, the PCI selection circuitry 1342, shown and described above in connection with FIG. 13, may determine whether the UE is to use an implicit rule to determine a timing reference for the SSB measurement or use explicit signaling from the BS to determine a timing reference for the SSB measurement. In addition, the PCI selection circuitry 1342 together with the communication and processing circuitry 1341 and the transceiver 1310, shown and described above in connection with FIG. 13, may transmit or broadcast information that indicates that the implicit rule or a particular PCI indicated by the explicit signaling is to be used by the UE.

In some examples, the SSB measurement may be for a change of a primary cell, a change of a secondary cell, or a change of a primary secondary cell. In some examples, the SSB measurement may include a Protocol Layer 3 measurement. In some examples, the SSB measurement may be based on an SSB measurement timing configuration (SMTC).

In some examples, the PCI selection indication may specify that the UE is to use a predefined rule to select the timing reference. In some examples, the PCI selection indication may specify that the UE is to use a predefined rule to select the timing reference from a subset of a plurality of candidate PCIs for the UE. In some examples, the subset may include a plurality of selected PCIs for serving the UE. In some examples, the PCI selection indication may specify that the UE is to use a predefined rule to select the timing reference from a set of candidate PCIs of at least one serving cell for the UE. In some examples, the PCI selection indication may specify that the UE is to select a particular timing reference associated with a lowest PCI value. In some examples, the PCI selection indication may specify that the UE is to select a particular timing reference associated with a highest PCI value.

In some examples, the PCI selection indication may specify that the UE is use to a particular timing reference identified by the base station. In some examples, the process may further include selecting the particular timing reference and transmitting an indication of the particular timing reference to the UE. In some examples, selecting the particular timing reference may include selecting the particular timing reference from a subset of a set of candidate PCIs for the UE. In some examples, selecting the particular timing reference may include selecting the particular timing reference from a set of candidate PCIs of at least one serving cell for the UE. In some examples, transmitting the indication of the particular timing reference may include transmitting the indication of the particular timing reference via downlink control information (DCI), a medium access control-control element (MAC-CE), or a radio resource control (RRC) message.

At block 1404, the BS may receive a measurement report from the UE after transmitting the PCI selection indication. For example, the mobility circuitry 1343 in cooperation with the communication and processing circuitry 1341 and the transceiver 1310, shown and described above in connection with FIG. 13, may receive a message including measurement report information from the UE. In some examples, the measurement report may be based on a particular timing reference selected by the UE according to the PCI selection indication.

At block 1406, the BS may conduct a mobility operation for the UE based on the measurement report. For example, the mobility circuitry 1343 may determine, based on the measurement report, whether to change the PCIs in the set of candidate PCIs for the UE or change the PCIs in the subset of PCIs selected for serving the UE.

Figure 15:
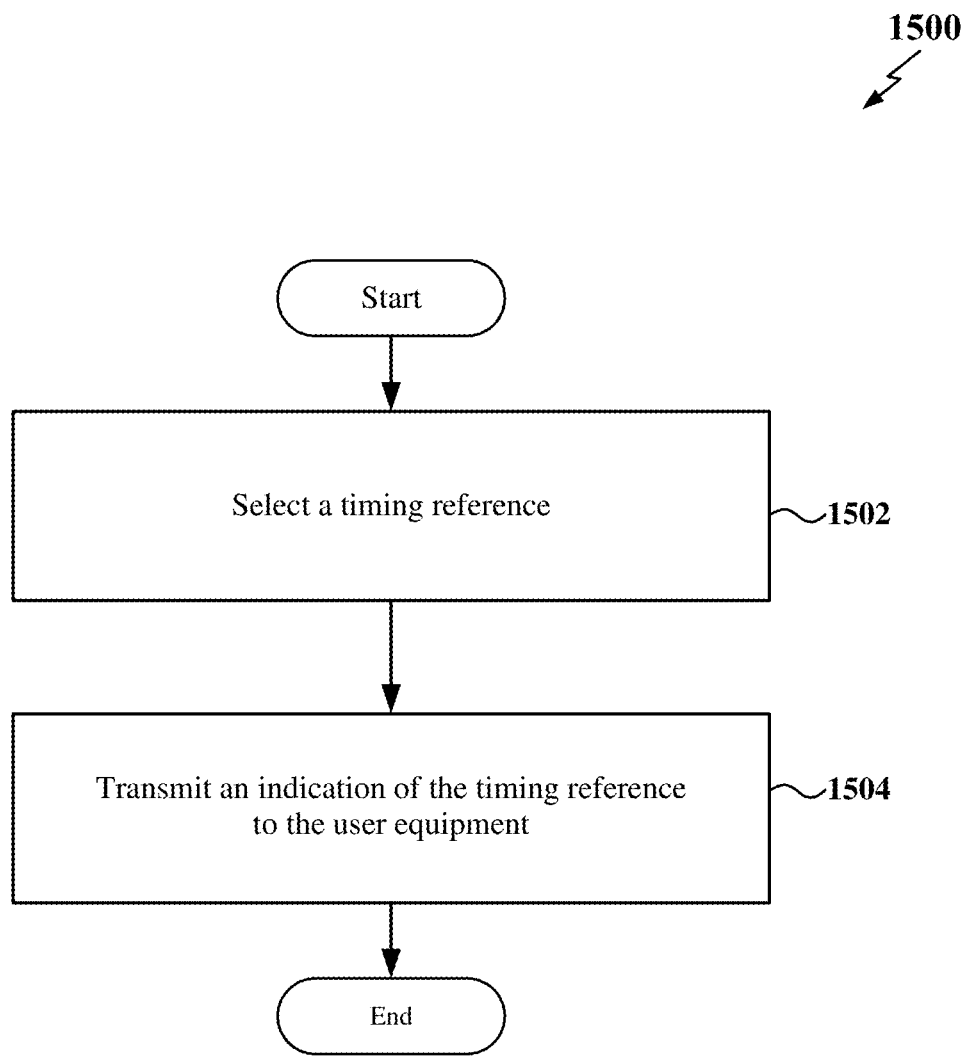
FIG. 15 is a flow chart illustrating an example timing reference selection method according to some aspects.

FIG. 15 is a flow chart illustrating an example wireless communication method 1500 according to some aspects. In some examples, the method 1500 may be implemented in conjunction with (e.g., in addition to or as part of) the method 1400 of FIG. 14. As described below, some or all illustrated features may be omitted in a particular implementation within the scope of the disclosure, and some illustrated features may not be required for implementation of all examples. In some examples, the method 1500 may be carried out by any of the BSs or scheduling entities shown in any of FIGS. 1, 2, 5, 6, 7, 8, 9, and 13. In some examples, the method 1500 may be carried out by the processing system 1314 of FIG. 13. In some examples, the method 1500 may be carried out by any suitable apparatus or means for carrying out the functions or algorithm described below.

At block 1502, a BS may select a timing reference. For example, the PCI selection circuitry 1342, shown and described above in connection with FIG. 13, may determine that the UE is to use a particular timing reference (e.g., timing of an anchor cell) for the SSB measurement.

At block 1504, the BS may transmit an indication of the timing reference to the user equipment. For example, the PCI selection circuitry 1342 together with the communication and processing circuitry 1341 and the transceiver 1310, shown and described above in connection with FIG. 13, may transmit the indication in a DCI sent on a PDCCH or in a MAC-CE or RRC message sent on a PDSCH.

The following provides an overview of several aspects of the present disclosure.

Aspect 1: A method for wireless communication at a user equipment, the method comprising: receiving, from a base station, a first indication of a set of candidate physical cell identifiers (PCIs) for the user equipment; selecting a first PCI from the set of candidate PCIs; determining a timing reference for a synchronization signal block (SSB) measurement from downlink receive timing associated with the first PCI; and conducting the SSB measurement using the timing reference.

Aspect 2: The method of aspect 1, further comprising: receiving, from the base station, a second indication of a subset of the set of candidate PCIs, wherein the selecting the first PCI from the set of candidate PCIs comprises selecting the first PCI from the subset.

Aspect 3: The method of aspect 2, wherein the subset only includes the first PCI.

Aspect 4: The method of any of aspects 1 through 3, wherein a first transmit receive point of a first serving cell for the user equipment is identified by a second PCI of the set of candidate PCIs and second transmit receive point of the first serving cell is identified by a third PCI of the set of candidate PCIs.

Aspect 5: The method of any of aspects 1 through 4, wherein a first serving cell for the user equipment is identified by a second PCI of the set of candidate PCIs and a second serving cell for the user equipment is identified by a third PCI of the set of candidate PCIs.

Aspect 6: The method of any of aspects 1 through 5, wherein the set of candidate PCIs comprise a plurality of PCIs of at least one serving cell for the user equipment.

Aspect 7: The method of aspect 6, wherein: the first PCI comprises an anchor PCI for the user equipment; the anchor PCI is associated with at least one of broadcast traffic, control traffic, measurement report traffic, or any combination thereof; and at least one PCI of the plurality of PCIs is associated with data traffic.

Aspect 9: The method of any of aspects 1 through 7, further comprising: receiving a PCI selection indication from the base station; and using the PCI selection indication to select the first PCI.

Aspect 10: The method of aspect 9, wherein the PCI selection indication specifies that the user equipment is to use a predefined rule to select the first PCI.

Aspect 11: The method of aspect 10, further comprising: receiving, from the base station, a second indication of a subset of the set of candidate PCIs; and using the predefined rule to select the first PCI from the subset.

Aspect 12: The method of any of aspects 10 through 11, wherein: the set of candidate PCIs comprise a plurality of PCIs of at least one serving cell for the user equipment; and the method further comprises using the predefined rule to select the timing reference from the plurality of PCIs.

Aspect 13: The method of any of aspects 10 through 12, wherein the predefined rule specifies that the user equipment is to select a PCI associated with a lowest PCI value or a highest PCI value.

Aspect 14: The method of any of aspects 9 through 13, wherein the PCI selection indication specifies that the user equipment is use to a particular PCI identified by the base station.

Aspect 15: The method of aspect 14, further comprising: receiving an indication of the particular PCI from the base station.

Aspect 16: The method of any of aspects 1 through 7 and 9 through 15, wherein: the set of candidate PCIs is associated with a plurality of transmit receive points (TRPs) of a serving cell for the user equipment; or the set of candidate PCIs is associated with a plurality of serving cells for the user equipment.

Aspect 17: A method for wireless communication at a base station, the method comprising: transmitting a physical cell identifier (PCI) selection indication to a user equipment, wherein the PCI selection indication specifies a selection procedure for selecting a timing reference associated with a PCI for a synchronization signal block (SSB) measurement; receiving a measurement report from the user equipment after transmitting the PCI selection indication; and conducting a mobility operation for the user equipment based on the measurement report.

Aspect 18: The method of aspect 17, wherein the PCI selection indication specifies that the user equipment is to use a predefined rule to select the timing reference.

Aspect 19: The method of any of aspects 17 through 18, wherein the PCI selection indication specifies that the user equipment is to use a predefined rule to select the timing reference from a subset of a set of candidate PCIs for the user equipment.

Aspect 20: The method of aspect 19, wherein the subset comprises a plurality of selected PCIs for serving the user equipment.

Aspect 21: The method of any of aspects 17 through 20, wherein the PCI selection indication specifies that the user equipment is to use a predefined rule to select the timing reference from a set of candidate PCIs of at least one serving cell for the user equipment.

Aspect 22: The method of any of aspects 17 through 21, wherein the PCI selection indication specifies that the user equipment is to select a particular timing reference associated with a lowest PCI value.

Aspect 23: The method of any of aspects 1 through 22, wherein the PCI selection indication specifies that the user equipment is to select a particular timing reference associated with a highest PCI value.

Aspect 24: The method of any of aspects 17 through 23, wherein the PCI selection indication specifies that the user equipment is use to a particular timing reference identified by the base station.

Aspect 26: The method of any of aspects 17 through 24, wherein: the PCI selection indication specifies that the user equipment is use to a particular timing reference identified by the base station; and the method further comprises selecting the particular timing reference and transmit an indication of the particular timing reference to the user equipment.

Aspect 27: The method of aspect 26, further comprising: selecting the particular timing reference from a subset of a set of candidate PCIs for the user equipment.

Aspect 28: The method of any of aspects 26 through 27, further comprising: selecting the particular timing reference from a set of candidate PCIs of at least one serving cell for the user equipment.

Aspect 29: The method of any of aspects 26 through 28, further comprising: transmitting the indication of the particular timing reference via downlink control information (DCI), a medium access control-control element (MAC-CE), or a radio resource control (RRC) message.

Aspect 30: The method of any of aspects 17 through 24 and 26 through 29, wherein the measurement report is based on a particular timing reference selected by the user equipment according to the PCI selection indication.

Aspect 31: A user equipment comprising: a transceiver configured to communicate with a radio access network, a memory, and a processor communicatively coupled to the transceiver and the memory, wherein the processor and the memory are configured to perform any one of aspects 1 through 7 and 9 through 16.

Aspect 32: An apparatus configured for wireless communication comprising at least one means for performing any one of aspects 1 through 7 and 9 through 16.

Aspect 33: A non-transitory computer-readable medium storing computer-executable code, comprising code for causing an apparatus to perform any one of aspects 1 through 7 and 9 through 16.

Aspect 34: A base station comprising: a transceiver, a memory, and a processor communicatively coupled to the transceiver and the memory, wherein the processor and the memory are configured to perform any one of aspects 17 through 24 and 26 through 30.

Aspect 35: An apparatus configured for wireless communication comprising at least one means for performing any one of aspects 17 through 24 and 26 through 30.

Aspect 36: A non-transitory computer-readable medium storing computer-executable code, comprising code for causing an apparatus to perform any one of aspects 17 through 24 and 26 through 30.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 5, 6, 7, 8, 9, 10, and 13 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment, the method comprising:
   receiving, from a base station, a first indication of a set of candidate physical cell identifiers (PCIs) for the user equipment;
   receiving a downlink signal associated with a first PCI selected by the user equipment from the set of candidate PCIs; and
   measuring synchronization signal blocks (SSBs) associated with at least two PCIs of the set of candidate PCIs according to a timing reference that is based on downlink receive timing derived from the downlink signal associated with the first PCI.

2. The method of claim 1, further comprising:
   receiving, from the base station, a second indication of a subset of the set of candidate PCIs; and
   selecting the first PCI from the subset.

3. The method of claim 2, wherein the subset only includes the first PCI.

4. The method of claim 1, wherein a first transmit receive point of a first serving cell for the user equipment is identified by a second PCI of the set of candidate PCIs and a second transmit receive point of the first serving cell is identified by a third PCI of the set of candidate PCIs.

5. The method of claim 1, wherein a first serving cell for the user equipment is identified by a second PCI of the set of candidate PCIs and a second serving cell for the user equipment is identified by a third PCI of the set of candidate PCIs.

6. The method of claim 1, wherein the set of candidate PCIs comprise a plurality of PCIs of at least one serving cell for the user equipment.

7. The method of claim 6, wherein:
   the first PCI comprises an anchor PCI for the user equipment;
   the anchor PCI is associated with at least one of broadcast traffic, control traffic, measurement report traffic, or any combination thereof; and
   at least a second PCI of the plurality of PCIs is associated with data traffic.

8. The method of claim 1, further comprising:
   receiving a PCI selection indication from the base station; and
   using the PCI selection indication to select the first PCI.

9. The method of claim 8, wherein the PCI selection indication specifies that the user equipment is to use a predefined rule to select the first PCI.

10. The method of claim 9, further comprising:
    receiving, from the base station, a second indication of a subset of the set of candidate PCIs; and
    using the predefined rule to select the first PCI from the subset.

11. The method of claim 9, wherein:
the set of candidate PCIs comprise a plurality of PCIs of at least one serving cell for the user equipment; and
the method further comprises using the predefined rule to select the timing reference from the plurality of PCIs.

12. The method of claim 9, wherein the predefined rule specifies that the user equipment is to select a PCI associated with a lowest PCI value or a highest PCI value.

13. The method of claim 8, wherein the PCI selection indication specifies that the user equipment is to use a particular PCI identified by the base station.

14. The method of claim 13, further comprising:
receiving an indication of the particular PCI from the base station.

15. The method of claim 1, wherein:
the set of candidate PCIs is associated with a plurality of transmit receive points (TRPs) of a serving cell for the user equipment; or
the set of candidate PCIs is associated with a plurality of serving cells for the user equipment.

16. An apparatus for wireless communication, comprising:
and
one or more memories storing processor-executable code; and
one or more processors configured to execute the processor-executable code and cause the apparatus to:
receive, from a base station via the transceiver, a first indication of a set of candidate physical cell identifiers (PCIs) for the apparatus;
receive, via the transceiver, a downlink signal associated with a first PCI selected by the apparatus from the set of candidate PCIs; and
measure synchronization signal blocks (SSBs) associated with at least two PCIs of the set of candidate PCIs according to a timing reference that is based on downlink receive timing derived from the downlink signal associated with the first PCI.

17. The apparatus of claim 16, wherein the one or more processors is further configured to execute the processor-executable code and cause the apparatus to:
receive a PCI selection indication from the base station; and
use the PCI selection indication to select the first PCI.

18. The apparatus of claim 17, wherein the PCI selection indication specifies that the apparatus is to use a predefined rule to select the first PCI.

19. The apparatus of claim 18, wherein the one or more processors is further configured to execute the processor-executable code and cause the apparatus to:
receive, from the base station, a second indication of a subset of the set of candidate PCIs; and
use the predefined rule to select the first PCI from the subset.

20. The apparatus of claim 18, wherein:
the set of candidate PCIs comprise a plurality of PCIs of at least one serving cell for the apparatus; and
the one or more processors is further configured to execute the processor-executable code and cause the apparatus to use the predefined rule to select the timing reference from the plurality of PCIs.

21. The apparatus of claim 18, wherein the predefined rule specifies that the apparatus is to select a PCI associated with a lowest PCI value or a highest PCI value.

22. The apparatus of claim 17, wherein the PCI selection indication specifies that the apparatus is to use a particular PCI identified by the base station.

23. The apparatus of claim 22, wherein the one or more processors is further configured to execute the processor-executable code and cause the apparatus to:
receive an indication of the particular PCI from the base station.

24. The apparatus of claim 16, wherein:
the set of candidate PCIs is associated with a plurality of transmit receive points (TRPs) of a serving cell for the apparatus; or
the set of candidate PCIs is associated with a plurality of serving cells for the apparatus.

25. The apparatus of claim 16, wherein the one or more processors is further configured to execute the processor-executable code and cause the apparatus to:
receive, from the base station, a second indication of a subset of the set of candidate PCIs; and
select the first PCI from the subset.

26. The apparatus of claim 25, wherein the subset only includes the first PCI.

27. The apparatus of claim 16, wherein the one or more processors is further configured to execute the processor-executable code and cause the apparatus to:
identify a first transmit receive point of a first serving cell for the apparatus based on a second PCI of the set of candidate PCIs; and
identify a second transmit receive point of the first serving cell based on a third PCI of the set of candidate PCIs.

28. The apparatus of claim 16, wherein the one or more processors is further configured to execute the processor-executable code and cause the apparatus to:
identify a first serving cell for the apparatus based on a second PCI of the set of candidate PCIs; and
identify a second serving cell for the apparatus based on a third PCI of the set of candidate PCIs.

29. A user equipment, comprising:
means for receiving, from a base station, a first indication of a set of candidate physical cell identifiers (PCIs) for the user equipment;
means for receiving a downlink signal associated with a first PCI selected by the user equipment from the set of candidate PCIs; and
means for measuring synchronization signal blocks (SSBs) associated with at least two PCIs of the set of candidate PCIs according to a timing reference that is based on downlink receive timing derived from the downlink signal associated with the first PCI.

30. A non-transitory computer-readable medium having stored therein instructions executable by one or more processors of a user equipment to:
receive, from a base station, a first indication of a set of candidate physical cell identifiers (PCIs) for the user equipment;
receive a downlink signal associated with a first PCI selected by the user equipment from the set of candidate PCIs; and
measure synchronization signal blocks (SSBs) associated with at least two PCIs of the set of candidate PCIs according to a timing reference that is based on downlink receive timing derived from the downlink signal associated with the first PCI.

* * * * *